US008644826B2

(12) United States Patent
Futaki et al.

(10) Patent No.: US 8,644,826 B2
(45) Date of Patent: *Feb. 4, 2014

(54) WIRELESS COMMUNICATION SYSTEM, COMMUNICATION CONTROL METHOD, RADIO BASE STATION, RADIO TERMINAL, AND STORAGE MEDIUM

(75) Inventors: Hisashi Futaki, Tokyo (JP); Jinsock Lee, Tokyo (JP)

(73) Assignee: NEC Corporation, Tokyo (JP)

( * ) Notice: Subject to any disclaimer, the term of this patent is extended or adjusted under 35 U.S.C. 154(b) by 126 days.

This patent is subject to a terminal disclaimer.

(21) Appl. No.: 13/142,199

(22) PCT Filed: Dec. 25, 2009

(86) PCT No.: PCT/JP2009/007252
§ 371 (c)(1),
(2), (4) Date: Jun. 24, 2011

(87) PCT Pub. No.: WO2010/073701
PCT Pub. Date: Jul. 1, 2010

(65) Prior Publication Data
US 2011/0256824 A1    Oct. 20, 2011

(30) Foreign Application Priority Data
Dec. 26, 2008  (JP) ................................ 2008-335193

(51) Int. Cl.
*H04W 4/00* (2009.01)
(52) U.S. Cl.
USPC ......... 455/435.2; 455/436; 455/438; 455/439

(58) Field of Classification Search
USPC ........... 455/424, 426.1, 435.2, 436–444, 449, 455/450, 545, 503; 370/328
See application file for complete search history.

(56) References Cited

U.S. PATENT DOCUMENTS

| 2002/0106985 | A1* | 8/2002 | Sato et al. ..................... 455/3.01 |
| 2006/0058034 | A1* | 3/2006 | Vaittinen et al. .............. 455/450 |
| 2006/0079242 | A1* | 4/2006 | Vaittinen et al. .............. 455/453 |
| 2006/0223557 | A1* | 10/2006 | Manohar ....................... 455/502 |

(Continued)

FOREIGN PATENT DOCUMENTS

| WO | 2007/117184 A1 | 10/2007 |
| WO | 2008/129812 A1 | 10/2008 |
| WO | 2008/136469 A1 | 11/2008 |

OTHER PUBLICATIONS

Paging a single receiver UE for MBMS Dedicated Layer, LG Electronics Inc., 3GPP TSG-RAN WG2 #56, R2-063240, Nov. 6-10, 2006.

(Continued)

*Primary Examiner* — Dominic E Rego
(74) *Attorney, Agent, or Firm* — Sughrue Mion, PLLC

(57) ABSTRACT

Even when a radio terminal cannot receive content data from a base station to which the radio terminal serves, the radio terminal receives the content data from other base station. A wireless communication system (1) includes a plurality of radio base stations (21 to 23) and a radio terminal (40). The radio terminal (40) serves to a specific radio base station (serving radio base station) among the radio base stations (21 to 23). Moreover, the radio terminal (40) receives content data which is broadcasted or multicasted from a non-serving radio base station among the radio base stations (21 to 23) according to a gap pattern.

26 Claims, 21 Drawing Sheets

(56) References Cited

U.S. PATENT DOCUMENTS

| | | | | |
|---|---|---|---|---|
| 2007/0254620 | A1* | 11/2007 | Lindqvist et al. | 455/403 |
| 2008/0274742 | A1* | 11/2008 | Bi | 455/437 |
| 2010/0069089 | A1* | 3/2010 | Wang | 455/456.1 |
| 2010/0124203 | A1* | 5/2010 | Tenny et al. | 370/331 |
| 2010/0279696 | A1* | 11/2010 | Voyer et al. | 455/440 |

OTHER PUBLICATIONS

Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.5.0 Release 8); ETSI TS 136 300 V8.5.0 (Jul. 2008); 138 pgs.

Universal Mobile Telecommunications System (UMTS); Introduction of the Multimedia Broadcast/Multicast Service (MBMS) in the Radio Access Network (RAN); Stage 2; (3GPP TS 25.346 version 8.1.0 Release 8); ETSI TS 125 346 V8.1.0 (Oct. 2008); 66 pgs.

3rd Generation Partnership Project; Technical Specification Group Radio Access Networks; 3G Home NodeB Study Item Technical Report (Release 8); 3G TR 25.820 V8.1.1 (May 2008); 40 pgs.

* cited by examiner

US 8,644,826 B2

WIRELESS COMMUNICATION SYSTEM, COMMUNICATION CONTROL METHOD, RADIO BASE STATION, RADIO TERMINAL, AND STORAGE MEDIUM

CROSS REFERENCE TO RELATED APPLICATIONS

This application is a National Stage of International Application No. PCT/JP2009/007252 filed Dec. 25, 2009, claiming priority based on Japanese Patent Application No. 2008-335193, filed Dec. 26, 2008, the contents of all of which are incorporated herein by reference in their entirety.

TECHNICAL FIELD

The present invention relates to a wireless communication system which includes a plurality of radio base stations and a radio terminal that serves to any one of the radio base stations and performs communication with the corresponding base station, and a communication technology thereof.

BACKGROUND ART

Recently, in a mobile communication network, a multicast technology that multicasts data only to specified plural radio terminals has been focused upon. In a network that is called the Universal Mobile Telecommunication System (UMTS) of the $3^{rd}$ Generation Partnership Project (3GPP) specification, a multicast technology that is called a Multimedia Broadcast and Multicast Service (MBMS) for providing a multimedia broadcast or a multicast service has been supported. Also in Long Term Evolution (LTE), prospects for supporting the MBMS have been investigated (Non-Patent Document 1). According to the 3GPP standard specification, it is possible to support the MBMS regardless of the kind of base station (for example, macro base station or micro base station).

The radio terminal can receive a multicast signal or a broadcast signal of MBMS data in any state of an idle state that is a standby state and an active state. Also, when the radio terminal moves to another cell while receiving the MBMS data, cell reselection, cell update, or handover is executed in conjunction with the communication state of the corresponding radio terminal. In an idle state, the radio terminal receives paging information using a paging channel (PCCH) from a serving radio base station, and confirms whether or not an incoming call is present based on the paging information. The cell reselection means an operation of changing a base station that transmits the paging information (i.e. current serving radio base station) to another base station (another serving radio base station). On the other hand, the radio terminal that is in an active state establishes synchronization with the serving base station and performs transmission-and-reception of user data. Handover is an operation in which the radio terminal in an active state changes the serving base station to another base station.

In the 3GPP specification UMTS or LTE, a femto base station (which is also called a home base station) is defined as an inexpensive small base station having a limited performance differently from a macro base station (see Non-Patent Document 2 and Non-Patent Document 3). A general femto base station is a small base station which is installed indoors, is connected to an existing broadband line, and performs communication by accessing a communication network of a cellular system, such as UMTS, LTE, or the like, through the broadband line.

Related art documents regarding the 3GPP are, for example, Non-Patent Document 1, Non-Patent Document 2, and Non-Patent Document 3 listed below.

RELATED DOCUMENT

Non-Patent Document

[Non-Patent Document 1] 3GPP TS25.346 v810, Internet <URL:http://www.3gpp.org/ftp/Specs/html-info/25346.htm>

[Non-Patent Document 2] 3GPP TR25.820 v811, Internet <URL:http://www.3gpp.org/ftp/Specs/html-info/25820.htm>

[Non-Patent Document 3] 3GPP TS36.300 v850, Internet <URL:http://www.3gpp.org/ftp/Specs/html-info/36300.htm>

SUMMARY OF THE INVENTION

In the case where a cell of a femto base station (femto cell) and a cell of a macro base station (macro cell) are overlapped each other, a radio terminal that is within the area of the femto cell inevitably serves to the femto base station, but does not serve to the macro base station, because the received quality of a signal from the femto base station becomes better than the received quality of a signal from the macro base station at the radio terminal.

In the case where a radio terminal receives MBMS data in an idle state, in a cell of a macro base station that supports the MBMS, the radio terminal receives signals transmitted from the macro base station via a broadcast control channel (BCCH), a paging control channel (PCCH), a multicast control channel (MCCH), a multicast scheduling channel (MSCH), and a multicast traffic channel (MTCH). Even in the case where a radio terminal receiving MBMS data in a certain macro cell moves to another macro cell and then serves to another macro base station, it is possible for the radio terminal to continuously receive the MBMS data from the new serving macro base station via the MTCH as long as the new serving macro base station supports the MBMS.

On the other hand, the femto base station only has a limited function in comparison to the macro base station, and there is a high possibility that the femto base station does not support the MBMS. In this case, if the radio terminal executes cell reselection and moves from a macro cell of a macro base station that supports the MBMS to a femto cell of a femto base station that does not support the MBMS, the radio terminal receives the transmitted signal from the femto base station via the BCCH and PCCH, but is unable to receive the MBMS data. In this case, the radio terminal determines that it is out-of-service.

The cell reselection is executed based on the received quality of a downlink signal regardless of whether the radio terminal receives the MBMS data and whether the femto base station supports the MBMS. Because of this, the radio terminal becomes unable to continuously receive the MBMS service after the cell reselection.

The above-described problem is not limited to a case where the serving base station after the cell reselection is the femto base station, but may occur in the same manner even in the case of another macro base station that does not support the MBMS or in the case of a different kind of small base station which may be a micro base station or a pico base station.

Further, as long as the radio terminal serves to the femto base station that does not support the MBMS although the radio terminal is located in an area of a macro cell of the macro base station that supports the MBMS, it is impossible for the radio terminal to receive a multicast signal or a broadcast signal of the MBMS data as described above.

In consideration of the above-described circumstances, an object of the present invention is to provide a wireless communication system, a communication control method, a radio base station, a radio terminal, and a storage medium, which enable the radio terminal to receive content data such as MBMS data from another base station which is not a serving radio base station even if the radio terminal is unable to receive the content data from the serving base station.

According to the present invention, there is provided a wireless communication system that includes a radio terminal, a serving radio base station that is a radio base station to which the radio terminal serves, and a non-serving radio base station that is a radio base station to which the radio terminal does not serve. In this wireless communication system, the radio terminal receives content data which is broadcasted or multicasted from the non-serving radio base station in accordance with a gap pattern.

According to the present invention, there is provided a radio terminal in a wireless communication system that includes the radio terminal, a serving radio base station to which the radio terminal serves, and a non-serving radio base station to which the radio terminal does not serve. That radio terminal receives content data which is broadcasted or multicasted from the non-serving radio base station in accordance with a gap pattern.

According to the present invention, there is provided a radio base station to which a radio terminal serves in a wireless communication system that includes the radio terminal, the radio base station to which the radio terminal serves, and a non-serving radio base station that is a radio base station to which the radio terminal does not serve. That radio base station includes a communication control unit that generates a gap pattern when the radio terminal serves to the corresponding radio base station, and the communication control unit allows the radio terminal to receive content data which is broadcasted or multicasted from the non-serving radio base station in accordance with the gap pattern.

According to the present invention, there is provided a method of controlling communication of a radio terminal in a wireless communication system that includes the radio terminal, a serving radio base station that is a radio base station to which the radio terminal serves, and a non-serving radio base station that is a radio base station to which the radio terminal does not serve. That communication control method includes of selecting the non-serving radio base station, and of receiving content data which is broadcasted or multicasted from the non-serving radio base station in accordance with a gap pattern.

Also, according to the present invention, there is provided a storage medium which stores a program that is read from a recording medium of a radio terminal and enables a processor to execute a communication control process, the radio terminal in a wireless communication system that includes the radio terminal, a serving radio base station that is a radio base station to which the radio terminal serves, and a non-serving radio base station that is a radio base station to which the radio terminal does not serve. That communication control process includes a process of selecting the non-serving radio base station, and a process of receiving content data which is broadcasted or multicasted from the non-serving radio base station in accordance with a gap pattern.

According to the present invention, even if the serving base station to which the radio terminal serves does not deliver the content data via the broadcast or multicast, it becomes possible to receive the content data from the non-serving base station to which the radio terminal does not serve.

BRIEF DESCRIPTION OF THE DRAWINGS

The above and other objects, advantages and features of the present invention will be more apparent from the following description of certain preferred embodiments taken in conjunction with the accompanying drawings, in which.

DESCRIPTION OF EMBODIMENTS

Figure 1:
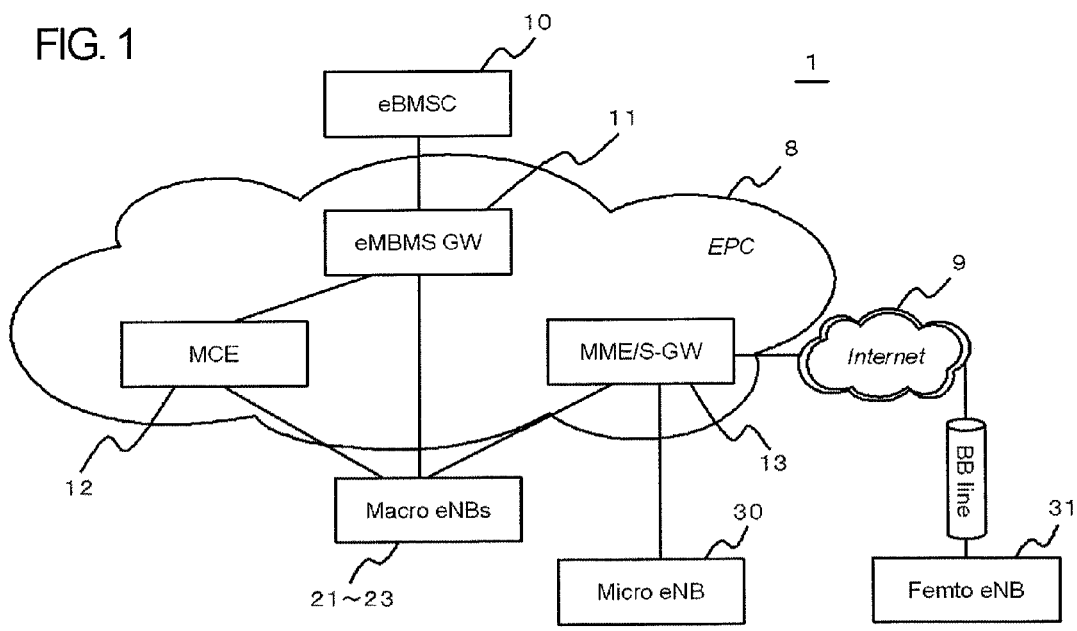
FIG. 1 is a functional block diagram illustrating the schematic configuration of a wireless communication system according to an embodiment of the present invention.

Hereinafter, embodiments of the present invention will be described with reference to the accompanying drawings. In this case, in all drawings, the same reference numerals are used for the same configuration elements, and their detailed explanation will not be repeated.

(Schematic Configuration of a Wireless Communication System)

Hereinafter, a wireless communication system (mobile communication system) according to an embodiment of the invention will be described. That wireless communication system has a preferred configuration based on the "3GPP Long Term Evolution (LTE)" specification, but is not limited thereto. FIG. 1 is a functional block diagram illustrating the schematic configuration of a wireless communication system 1 according to an embodiment of the present invention. This wireless communication system 1 includes first radio base stations 21, 22, and 23 which are macro base stations (macro eNBs (macro evolved Node Bs)), and a second radio base station group including a micro base station (micro eNB) 30 and a femto base station (femto eNB) 31. The micro base station 30 and the femto base station 31 is a small base station which manages a local and small cell (a communication area) that has a size different from respective cells (communication areas) of the macro base stations 21, 22, and 23. This kind of small base station, for example, has a function that covers the radius range of about several tens to several hundreds of meters.

The macro base stations 21, 22, and 23 are connected to a core network (Evolved Packet Core (EPC)) 8. The core network 8 is a network that integrally accommodates access networks in compliance with various kinds of standard specifications (for example, "3GPP", "3GPP2", "3GPP LTE" and known radio LAN standards).

The core network 8 accommodates an MBMS gateway (enhanced MBMS Gateway (eMBMS GW) 11, a multi-cell/multicast control device (Multi-cell/Multicast Coordination Entity (MCE)) 12, and a terminal mobility management device (Mobility Management Entity/Serving Gateway (MME/S-GW) 13. A broadcast/multicast service center (enhanced Broadcast Multicast Service Center (eBMSC)) 10 is connected to the core network 8 through the MBMS Gateway (eMBMS GW) 11.

On the other hand, an IP network (e.g. The Internet) 9 is connected to the terminal mobility management device 13 of the core network 8. A femto base station 31 is connected to the IP network 9 through a broadband (BB) line. The femto base station 31 may receive data from the core network 8 through the IP network 9 and the broadband line.

Figure 2:
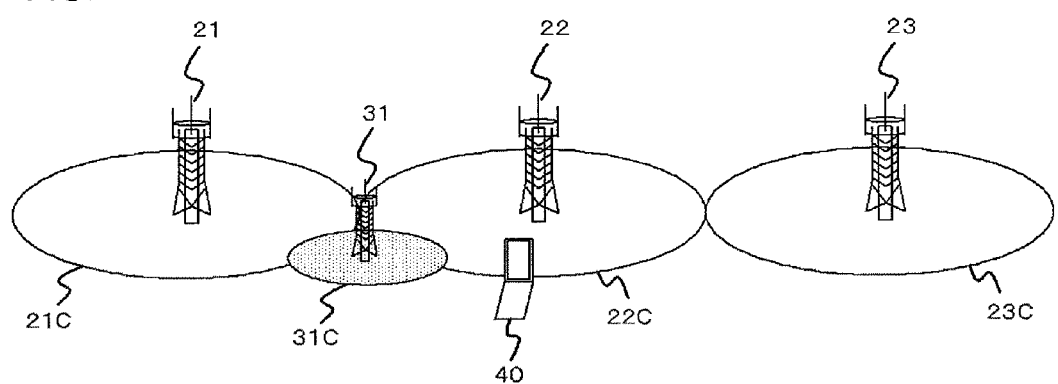
FIG. 2 is a diagram schematically illustrating a macro base station group, a femto base station, and a radio terminal.
Figure 3:
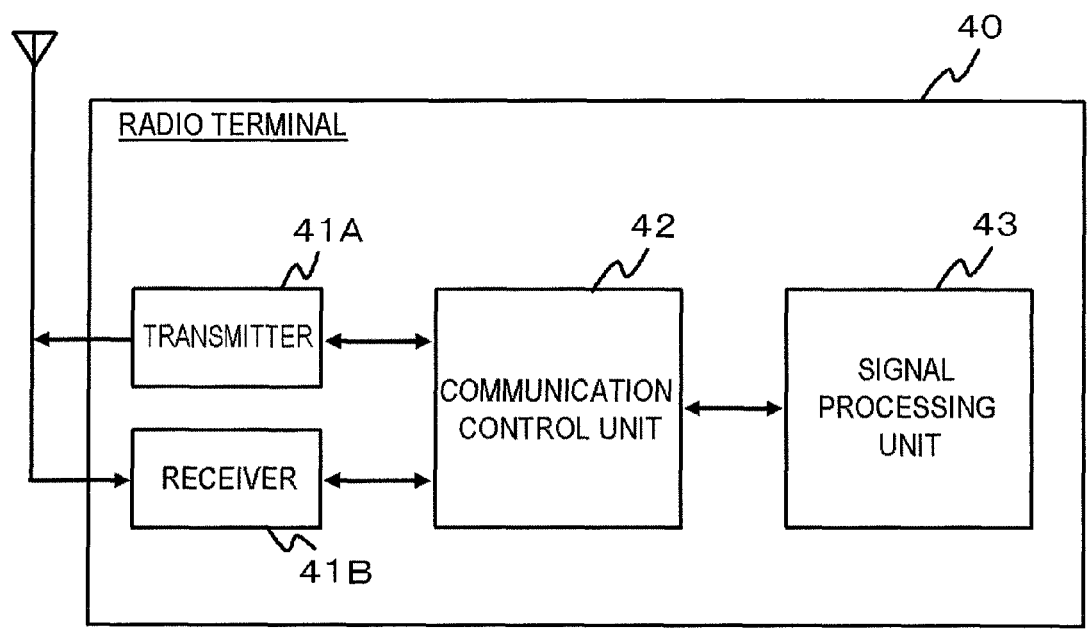
FIG. 3 is a diagram schematically illustrating the configuration of a radio terminal.

FIG. 2 is a diagram schematically illustrating the macro base stations 21, 22, and 23, the femto base station 31, and the radio terminal 40. The whole or a part of area of a femto cell 31C of the femto base station 31 is overlapped by any one of macro cells among the macro base stations 21, 22, and 23. A radio terminal (User Equipment (UE)) 40 such as a mobile terminal or the like serves to any one of base stations 21, 22, 23, and 31, and has a function of performing communication with the corresponding base station. As illustrated in FIG. 3, the radio terminal 40 has a transmitter 41A, a receiver 41B, a communication control unit 42, and a signal processing unit 43. The positions of the communication control unit 42 and the signal processing unit 43 may be replaced each other, and the signal processing unit 43 may be directly connected to the transmitter 41A and the receiver 41B.

Figure 4:
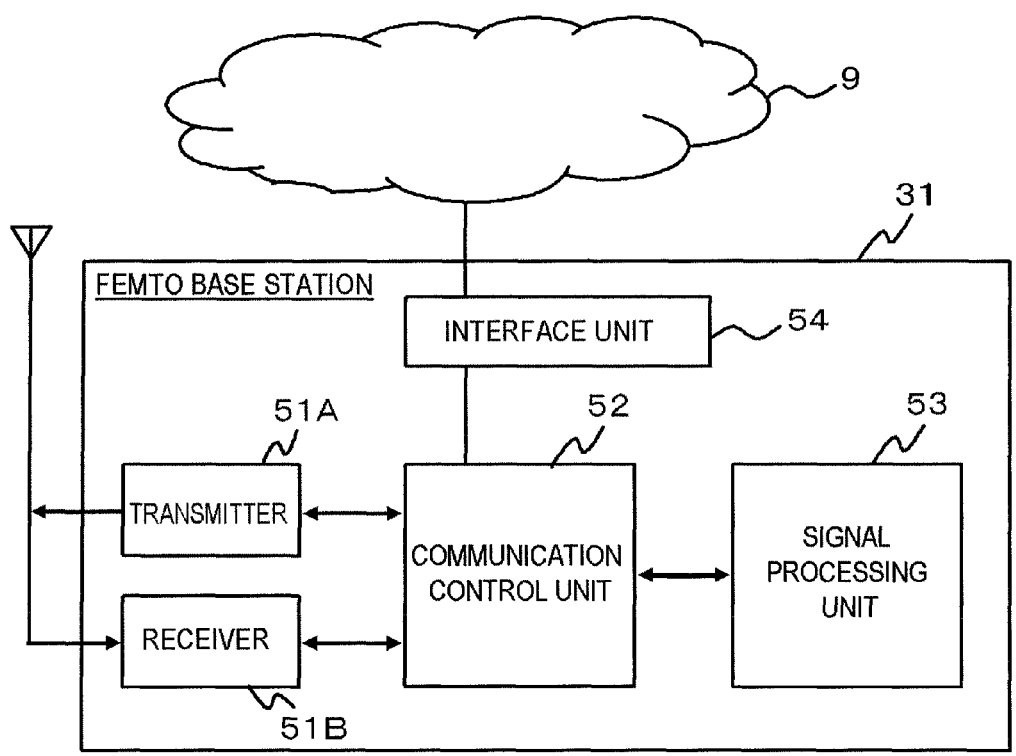
FIG. 4 is a diagram schematically illustrating the configuration of a femto base station.

FIG. 4 is a functional block diagram schematically illustrating the configuration of a femto base station (femto cell base station) 31. As illustrated in FIG. 4, the femto base station 31 has a transmitter 51A, a receiver 51B, a communication control unit 52, a signal processing unit 53, and an interface unit 54. The interface unit 54 is connected to the IP network 9 through a broadband line or an Ethernet (registered trademark) line, and is further connected to the core network 8 (FIG. 1) through the IP network 9.

The macro base stations 21, 22, and 23 have functions of performing broadcast delivery or multicast delivery of the content data. Also, the macro base stations 21, 22, and 23 have functions of performing content delivery by using an MBMS Single Frequency Network (MBSFN) technology that simultaneously transmits the same content data in the same frequency band. Since the radio terminal 40 can receive a signal in which broadcast signals or multicast signals, which are transmitted from the plural macro base stations 21, 22, and 23, are combined, a higher received quality than that in the case of receiving a unicast signal can be realized.

For example, when the radio terminal 40 has moved from a macro cell 21C of a macro base station 21 that performs multicast type MBMS delivery to the inside of a femto cell 31C of a femto base station 31 that does not perform the MBMS delivery, the radio terminal 40, which serves to the femto base station 31, cannot receive the content data. In this case, as described later, the communication control unit 42 of the radio terminal 40 performs communication control by using a gap pattern. The radio terminal 40 receives the content data according to this gap pattern (first embodiment to fourth embodiment). This gap pattern includes a periodic pattern in which an inactive period in which the radio terminal 40 receives a downlink signal from the serving base station and an active period that excludes the corresponding inactive period are alternately set by time. The receiver 41B has a function of receiving the content data from the macro base station 21 in the active period of the gap pattern in accordance with the communication control.

By using the gap pattern, the radio terminal 40 can continuously receive MBMS control information or MBMS data, which is transmitted via a channel (hereinafter called an "MBMS-related channel") that is used to transmit information on MBMS, from the macro base stations 21 to 23 even though the radio terminal serves, for example, to the femto base station 31.

At this time, if it is assumed that the serving base station of the radio terminal 40 is the femto base station 31 and the non-serving base stations of the radio terminal 40 are the macro base stations 21 to 23, the radio terminal 40 may start operations in various kinds of embodiments to be described later when the radio terminal 40 has served to the femto base station 31.

Alternatively, instead of the radio terminal 40, a radio terminal with two built-in receivers may be used. In this case, the communication control unit of the radio terminal makes the first receiver receive a downlink signal such as a paging message or the like from the serving radio base station and makes the second receiver receive content data from the non-serving radio base station.

A method in which the radio terminal 40 identifies the femto base station 31 may be an identification method based on information (for example, cell type) which is included in broadcast information that is transmitted from the femto base station 31 via BCCH, or an identification method based on a Physical layer Cell Identifier (physical cell ID) of the femto base station 31. The latter identification method uses the fact that the physical layer cell ID that is used in the macro base stations 21 to 23 and the physical layer cell ID that is used in the femto base station 31 can be distinguished from each other.

In the case of the multicast delivery, as an MBMS-related channel, a broadcast channel (BCCH), a Multicast Control Channel (MCCH), a Multicast Scheduling Channel (MSCH), or a Multicast Traffic Channel (MTCH) may be exemplified. It is possible for the radio terminal 40 to selectively receive signals of such MBMS-related channels per need basis. In this case, in the specification, the term "receiving a signal via an MBMS-related channel" includes not only the meaning of generating decoded data by applying a decoding process to a transmitted signal using an MBMS-related channel but also the meaning of observing (monitoring) the contents of the decoded data.

In this case, the MBMS-related channel is not limited to the above-described channel. For example, a channel that is called an MBMS notification Indicator Channel (MICH) is also included in the MBMS-related channel. Also, the multicast control channel (MCCH), the multicast scheduling channel (MSCH), and the multicast traffic channel (MTCH) have the same meanings as the MBMS control channel (MCCH), the MBMS scheduling channel, and the MBMS traffic channel, respectively.

Hereinafter, embodiments of the wireless communication system 1 as configured above will be described in detail.

First Embodiment

Figure 5:
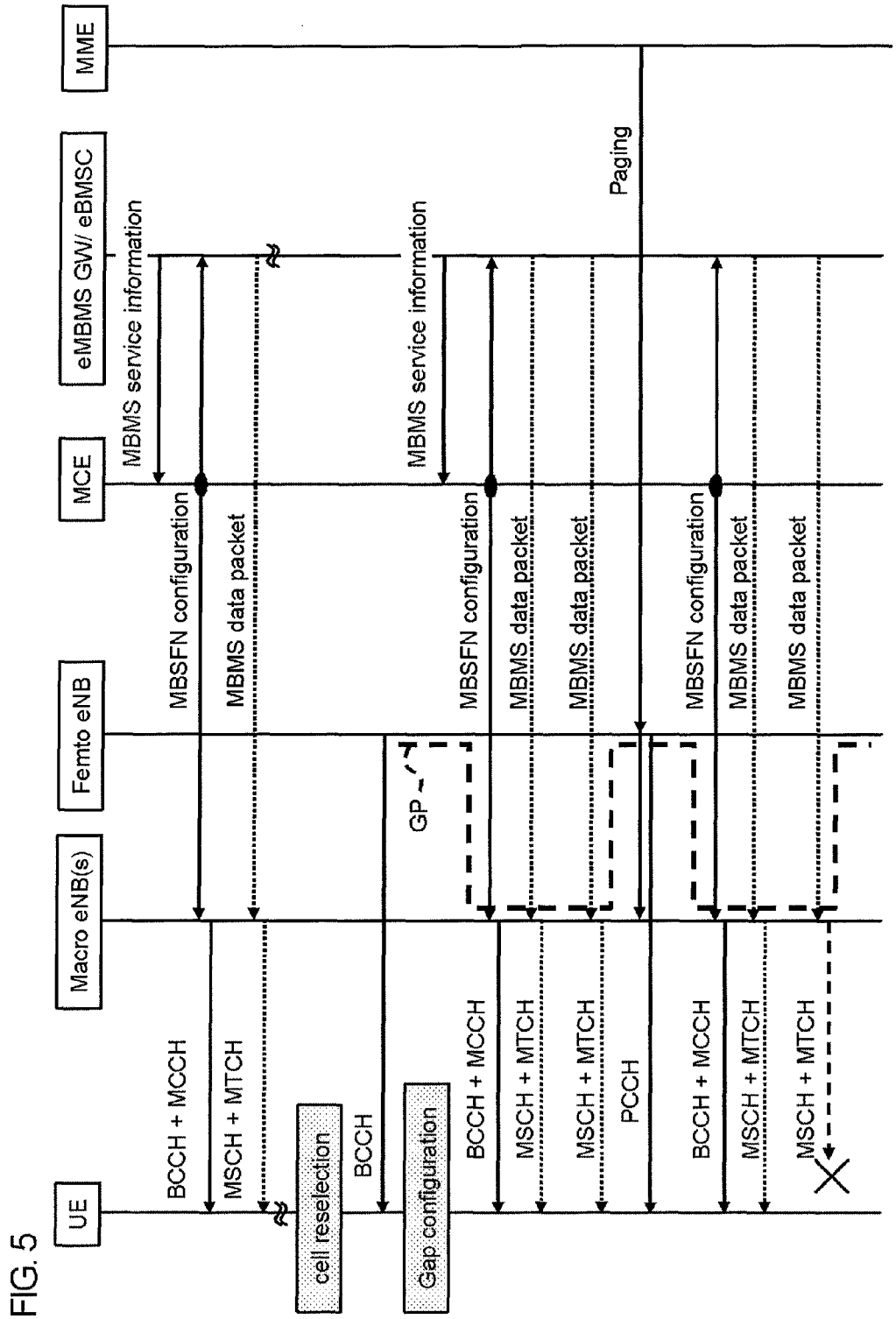
FIG. 5 is a diagram schematically illustrating a communication sequence of a wireless communication system according to a first embodiment of the invention.

FIG. 5 is a diagram schematically illustrating a communication sequence of the wireless communication system 1 according to a first embodiment. In an initial state of the wireless communication system 1, it is assumed that the radio terminal (User Equipment (UE)) 40 serves to any one of the macro base stations 21, 22, and 23 while it is in an idle state, and receives MBMS data by MBSFN from a plurality of macro base stations including the serving base station.

As illustrated in FIG. 5, at a certain time, a broadcast/multicast service center (eBMSC) 10 notifies a multi-cell/multicast control device (MCE) 12 of MBMS service information through an MBMS gateway (eMBMS GW) 11. The multi-cell/multicast control device (MCE) 12 determines MBSFN control information (MBSFN Configuration) based on MBSM service information that is received from the broadcast/multicast service center (eBMSC) 10, and notifies the broadcast/multicast service center (eBMSC) 10 and the macro base stations (macro eNBs) 21 to 23 of that control information. The macro base stations (macro eNBs) 21 to 23 transmit the MBSFN control information received from the multi-cell/multicast control device (MCE) 12 to the radio terminal (UE) 40 via the BCCH and the MCCH.

On the other hand, the broadcast/multicast service center (eBMSC) 10 transmits an MBMS data packet to the macro base stations (macro eNBs) 21 to 23 through the MBMS gateway (eMBMS GW) 11. The macro base stations (macro eNBs) 21 to 23 transmit the MBMS data packet received from the broadcast/multicast service center (eBMSC) 10 to the radio terminal (UE) 40 via the MSCH and the MTCH. As a result, the radio terminal (UE) 40 receives the MBMS data packets from the plurality of macro base stations (macro eNBs) 21 to 23 in an MBSFN manner.

If the communication control unit 42 of the radio terminal (UE) 40 detects that the received quality of the downlink signal from the femto base station 31 that is a non-serving radio base station of the radio terminal (UE) 40 is higher than the received quality of the downlink signal from the macro base station 21 that is a serving radio base station of the radio terminal (UE) 40 due to the movement of the radio terminal 40 itself or the change of a surrounding propagation environment, the communication control unit 42 of the radio terminal (UE) 40 executes cell reselection. Accordingly, the radio terminal (UE) 40 changes the serving base station thereof from the macro base station 21 to the femto base station 31. Here, a known pilot signal (reference signal) may be used as the downlink signal for measuring the received quality.

In this embodiment, the femto base station 31 does not support the MBMS. Because of this, as illustrated in FIG. 5, the radio terminal (UE) 40 receives broadcast information from the femto base station (femto eNB) 31 that is the new serving base station via the BCCH, and recognizes that the MBMS data is not delivered from the femto base station 31 based on the broadcast information. Here, if the broadcast information that is received from the femto base station (femto eNB) 31 includes MBMS control information (control information for the content data), the radio terminal (UE) 40 recognizes that the femto base station (femto eNB) 31 is a base station that delivers the MBMS data based on that control information. Also, if the broadcast information includes information that indicates whether or not the MBMS data (content data) is delivered from the femto base station (femto eNB) 31, the radio terminal (UE) 40 can recognize that the femto base station (femto eNB) 31 is a base station that delivers the MBMS data base on that information.

Then, the radio terminal (UE) 40 performs a periodic setting of a gap pattern GP (Gap Configuration). The gap pattern GP has an active period for avoiding a period (paging opportunity) in which there is a possibility that a paging message is transmitted from the femto base station 31 to the radio terminal 40 via the PCCH. In other words, the active period of the gap pattern GP is set to avoid the reception opportunity (timing) of the paging message. Also, since the active period of the gap pattern GP is a period for receiving the MBMS data packet, the gap pattern GP may be called an MBMS reception gap.

Figure 6:
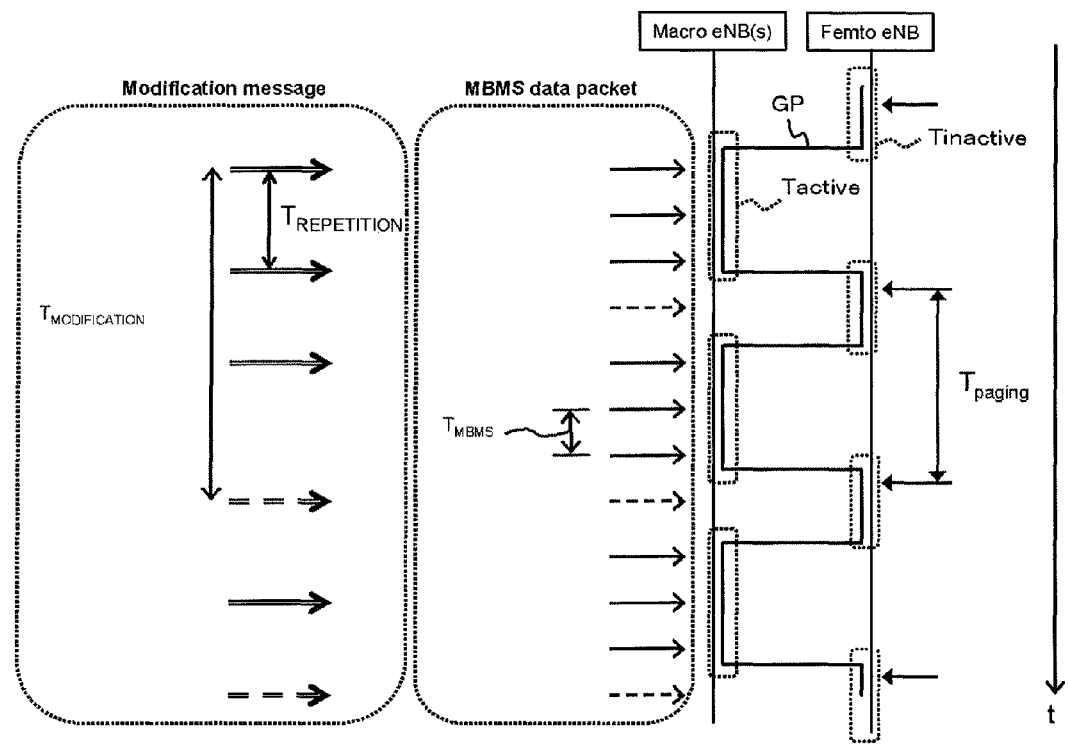
FIG. 6 is a diagram for explaining a gap pattern.

FIG. 6 is a diagram for explaining a gap pattern GP. As illustrated in FIG. 6, the gap pattern GP includes an inactive period (Inactive Gap) Tinactive that includes a period in which the radio terminal 40 should receive the paging message that periodically comes from the serving femto base station (femto eNB) 31 in a period Tpaging and an active period (Active Gap) Tactive in which it is not required to receive the paging message from the femto base station (femto eNB) 31. As illustrated in FIG. 6, the radio terminal 40 receives the MBMS data packet that periodically comes in a period TMBMS and a modification message that periodically comes in a period TREPETITION, as needed, during the active period Tactive, and does not receive the MBMS data packet and the modification message during the inactive period Tinactive of the gap pattern GP.

In FIG. 6, $T_{MODIFICATION}$ means a modification period. The modification message is MBMS control information that is transmitted from the macro base station 21 using the MCCH. The modification message is a message for notifying the modification of the MCCH, and the modification period is a period in which the modification of the MCCH may occur.

Referring to FIG. 5, during the active period Tactive, the radio terminal (UE) 40 continuously receives the data by the MBSFN in the same method as that when receiving the MBSFN control information and the MBMS data packet from the macro base station 21 before executing the cell reselection. That is, the radio terminal (UE) 40 receives the MBSFN control information via the BCCH and the MCCH and receives the MBMS data packet via the MSCH and the MTCH. Accordingly, the radio terminal (UE) 40 in an idle state can continuously receive a service in an MBSFN manner even after the serving base station is changed to the femto base station 31 that does not support the MBMS.

However, as illustrated in FIG. 6, the radio terminal 40 may not always receive all MBMS data packets during the active period Tactive. The reason is because it is required for the radio terminal 40 to preferentially receive the data (including paging message) from the serving femto base station 31. That is, in an idle state (during waiting for a call), it is required for the radio terminal 40 to receive a calling signal (paging message) that reports existence/nonexistence of an incoming call from the serving femto base station 31.

Figure 7:
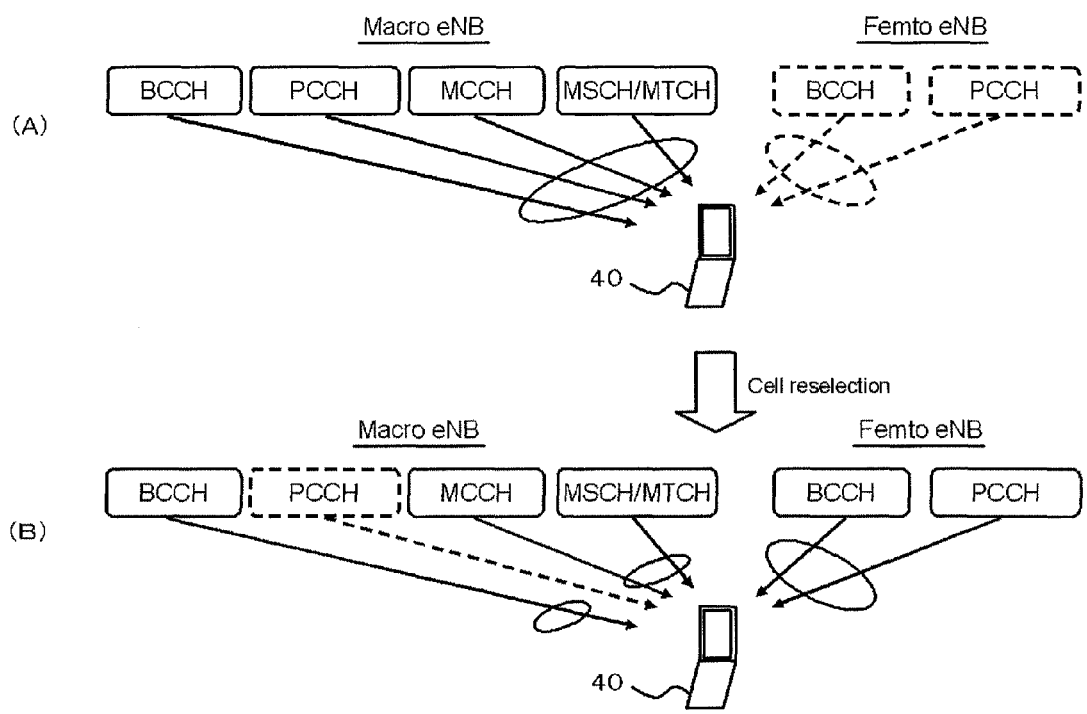
FIG. 7 is a diagram illustrating an example of a reception state of a radio terminal.

As illustrated in FIG. 7(A), before the cell reselection is executed, the radio terminal 40 in an idle state receives signals which are transmitted from the macro base station (macro eNB) 21 using the BCCH, PCCH, MCCH, MSCH, and MTCH. Here, the radio terminal 40 does not basically receive the signal transmitted from the femto base station (femto eNB) 31 using the BCCH and PCCH.

As illustrated in FIG. 7(B), when the cell reselection has been executed, the radio terminal 40, during the active period Tactive, receives signals which are transmitted from the macro base station (macro eNB) 21 via the BCCH, MCCH, MSCH, and MTCH. In this case, during the inactive period Tinactive, the radio terminal 40 receives the signals which are transmitted using the BCCH and PCCH, from the femto base station (femto eNB) 31.

Figure 8:
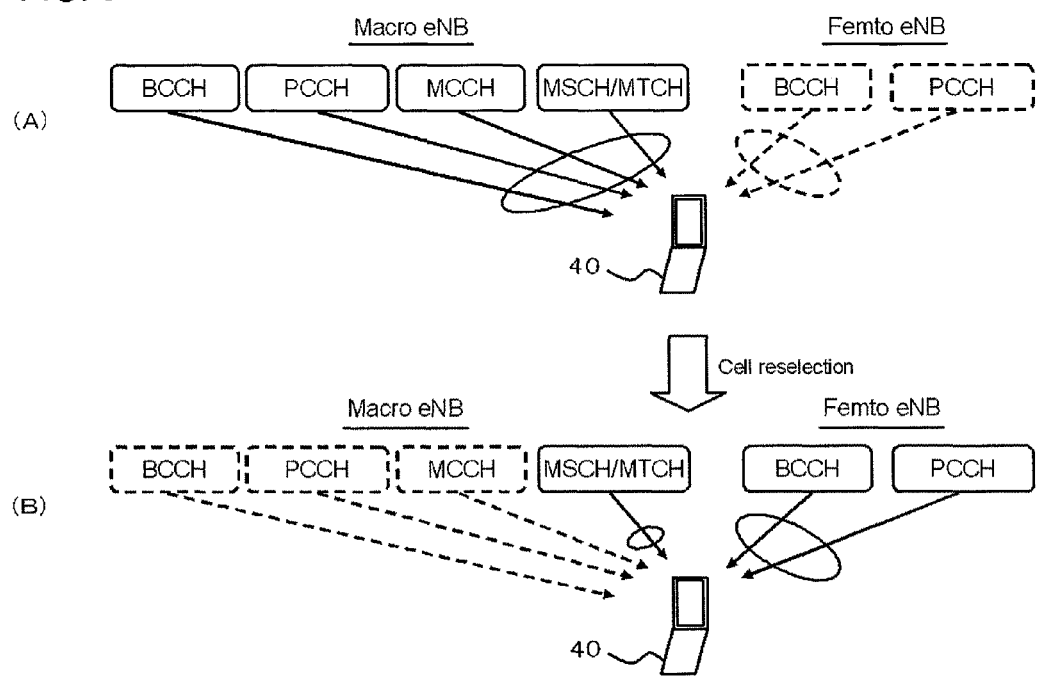
FIG. 8 is a diagram illustrating another example of a reception state of a radio terminal.

Here, instead of the reception state of the radio terminal 40 as illustrated in FIGS. 7(A) and (B), the reception state as illustrated in FIGS. 8(A) and (B) may be adopted. That is, before the cell reselection is executed, the reception state of FIG. 8(A) is the same as the reception state of FIG. 7(A). On the other hand, when the cell reselection has been executed, as illustrated in FIG. 8(B), during the active period Tactive, the communication control unit 42 of the radio terminal 40 holds the MBSFN control information and receives only the signals that are transmitted from the MSCH and MTCH. In this case, when the MBSFN control information is modified, the radio terminal 40 cannot continuously receive the service by the MBMS. However, even in the case where the MBSFN control information is modified and thus the radio terminal 40 cannot continuously receive the service by the MBMS, the radio terminal 40 may receive the signals which are transmitted via the BCCH and MCCH in order to receive the MBSFN control information.

In this case, the name of the above-described channel is exemplified based on the definition of a logical channel in the "3GPP LTE", and information that is transmitted using the respective channel is as follows.

The information that is transmitted using the BCCH may be, for example, as radio resource information for the MBSFN (MCH Subframe Allocation Pattern (MSAP)), information on downlink Subframe(s) that is(are) reserved for the MBSFN (mbsfn-SubframeConfiguration), information on radio frame including this MBSFN subframe (RadioFrame-Allocation), and information on MBSFN subframe included in one radio frame (subframeAllocation).

Figure 9:
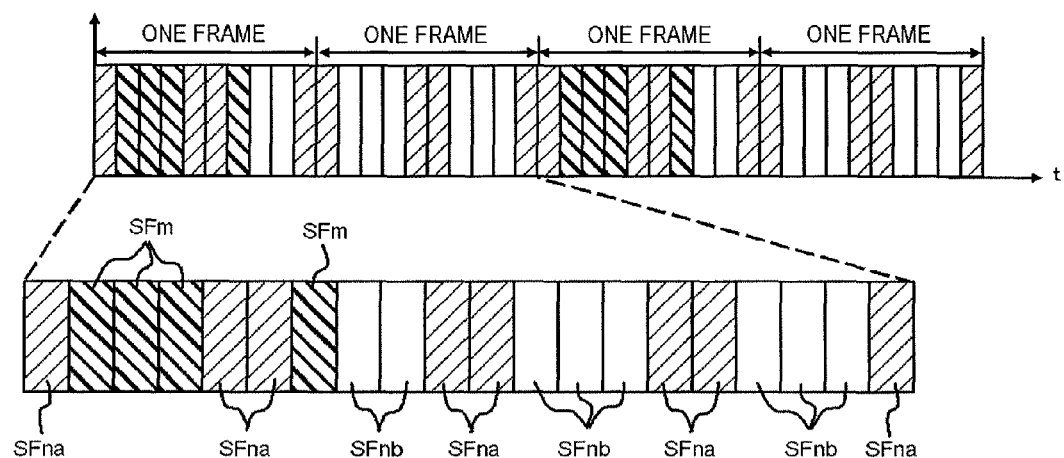
FIG. 9 is a schematic diagram illustrating an example of a radio frame structure of a downlink.

FIG. 9 is a schematic diagram illustrating an example of a radio frame structure of a downlink. The length of each radio frame is 10 milliseconds (ms), and each radio frame includes 10 subframes. The subframe SFm of FIG. 9 is MBSFN subframe, and its allocation is notified using MSAP information. Also, a subframe SFna is a subframe for transmitting a typical downlink signal, but cannot be used as the MBSFN subframe. The MSAP information is information that indicates the MBSFN subframe at a micro level and a macro level. Here, the micro level indicates a subframe unit, and the macro level indicates a frame (=10 subframes) unit.

Information that is transmitted using the MCCH may be, for example, information on the service index by the MBSFN or content data. The information that is transmitted using the MSCH, for example, is information that indicates where the respective content data are transmitted among the radio resources indicated in the MSAP. Also, the information that is transmitted using the MTCH is actual content data such as audio data, video data, or the like. Alternatively, other channels that are similar to these channels may be used.

Figure 10:
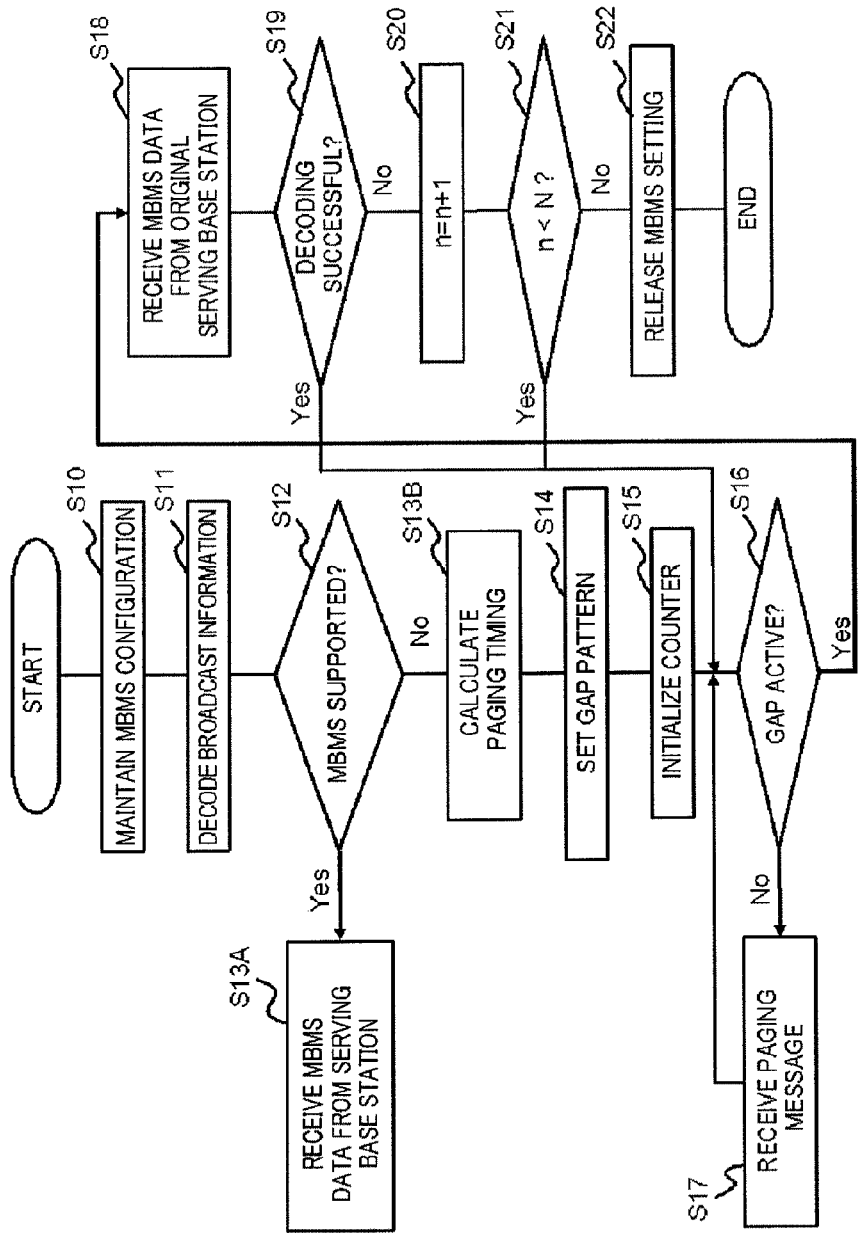
FIG. 10 is a flowchart schematically illustrating an operation procedure of a radio terminal after cell reselection.

Next, referring to FIG. 10, the operation of the radio terminal 40 after the cell reselection will be described. FIG. 10 is a flowchart schematically illustrating an operation procedure of the radio terminal 40 after the cell reselection.

As illustrated in FIG. 10, the communication control unit 42 of the radio terminal 40 first receives MBMS control information (MBMS configuration) from the macro base station 21 before the cell reselection, and maintains the configuration included in the MBMS control information (step S10).

Note that, the MBMS control information may be MBSFN control information, but may not always be the MBSFN control information. In this sense, the flowchart of FIG. 10 is not limited to the MBSFN, but may correspond to a general MBMS. Also, the setting included in the MBMS control information may not be kept, but the MBMS control information may be received again after the cell reselection.

Then, the receiver 41B receives the broadcast information that is transmitted from the femto base station 31 via the BCCH after the cell reselection, and decodes the broadcast information (step S11).

Thereafter, the communication control unit 42 determines whether the femto base station 31 that has transmitted the broadcast information supports the MBMS (step S12). If the corresponding femto base station 31 supports the MBMS ("YES" in step S12), the communication control unit 42 receives the MBMS data from the serving femto base station 31 so as to receive the service via the normal MBMS (step S13A).

If the corresponding femto base station 31 does not support the MBMS ("NO" in step S12), the communication control unit 42 calculates paging timing for receiving the paging message (PCCH data) from the serving femto base station 31 (step S13B), and sets the gap pattern GP based on the result of the calculation (step S14).

Thereafter, the communication control unit 42 starts a counter and initializes the count value n of this counter (step S15). This counter is to determine whether the radio terminal 40 is out-of-service.

Next, the communication control unit 42 determines whether the gap is active or inactive, that is, whether the current time is in an active period Tactive of the gap pattern GP or in an inactive period Tinactive of the gap pattern (step S16). If the gap is inactive ("NO" in step S16), the communication control unit 42 receives the paging message in an appropriate timing (step S17).

If the gap is active ("YES" in step S16), the communication control unit 42 receives MBMS data from the macro base station to which the corresponding radio terminal 40 served before the cell reselection or other surrounding macro base station (step S18). As a result, the radio terminal 40 can receive an MBMS data packet from the macro base station to which the radio terminal 40 served before the cell reselection or other surrounding macro base station.

Then, if decoding of the MBMS data is successful ("YES" in step S19), the communication control unit 42 determines that the MBMS data has been successfully received, and returns the process to step S16.

On the other hand, if the decoding of the MBMS data fails ("NO" in step S19), the counter increments a count value n (step S20), and the communication control unit 42 determines whether the count value n is less than a set value N (step S21). If the count value n does not reach the set value N ("YES" in step S21), the communication control unit 42 returns the process to step S16 to continue the communication control. On the other hand, if the count value n reaches the set value N ("NO" in step S21), the communication control unit 42 releases the MBMS setting (MBMS configuration) (step S22), and determines that the radio terminal 40 is out-of-service to finish the communication control.

In step S20 of the flowchart of FIG. 10, the counter may decrement the count value n instead of incrementing the count value n. In the case of decrementing the count value n, a step of determining whether the count value n exceeds the set value N is adopted instead of the step S21. Also, a step of determining whether the decoding has failed a predetermined number of times in succession may be adopted instead of the step S21. Further, it is needless to say that a method of determining whether the radio terminal 40 is out-of-service may be adopted as a method except for the counter. For example, if it is required for the radio terminal 40 to receive a paging message from the serving base station and to perform a call control process, or if it is required to perform the cell reselection, the out-of-service determination may be performed.

As described above, in the wireless communication system 1 according to the first embodiment, even in the case where the radio terminal 40 moves from the macro cell 21C of the macro base station 21 that performs broadcast delivery or multicast delivery to the inside of the femto cell 31C of the femto base station 31 that does not perform the broadcast delivery or the multicast delivery (or that is difficult to perform the broadcast delivery or the multicast delivery to the radio terminal 40) and the radio terminal 40 serves to the femto base station 31, it is possible for the radio terminal 40 to receive content data which is broadcasted or multicasted from the macro base station 21 to which the radio terminal 40 served before the movement or from other macro base station.

In this embodiment, the active period of the gap pattern GP is set to avoid the reception opportunity (timing) of the paging message. However, the active period of the gap pattern GP may be set to avoid the opportunity for receiving the broadcast information or the downlink dedicated signal in addition to the paging message.

Second Embodiment

Figure 11:
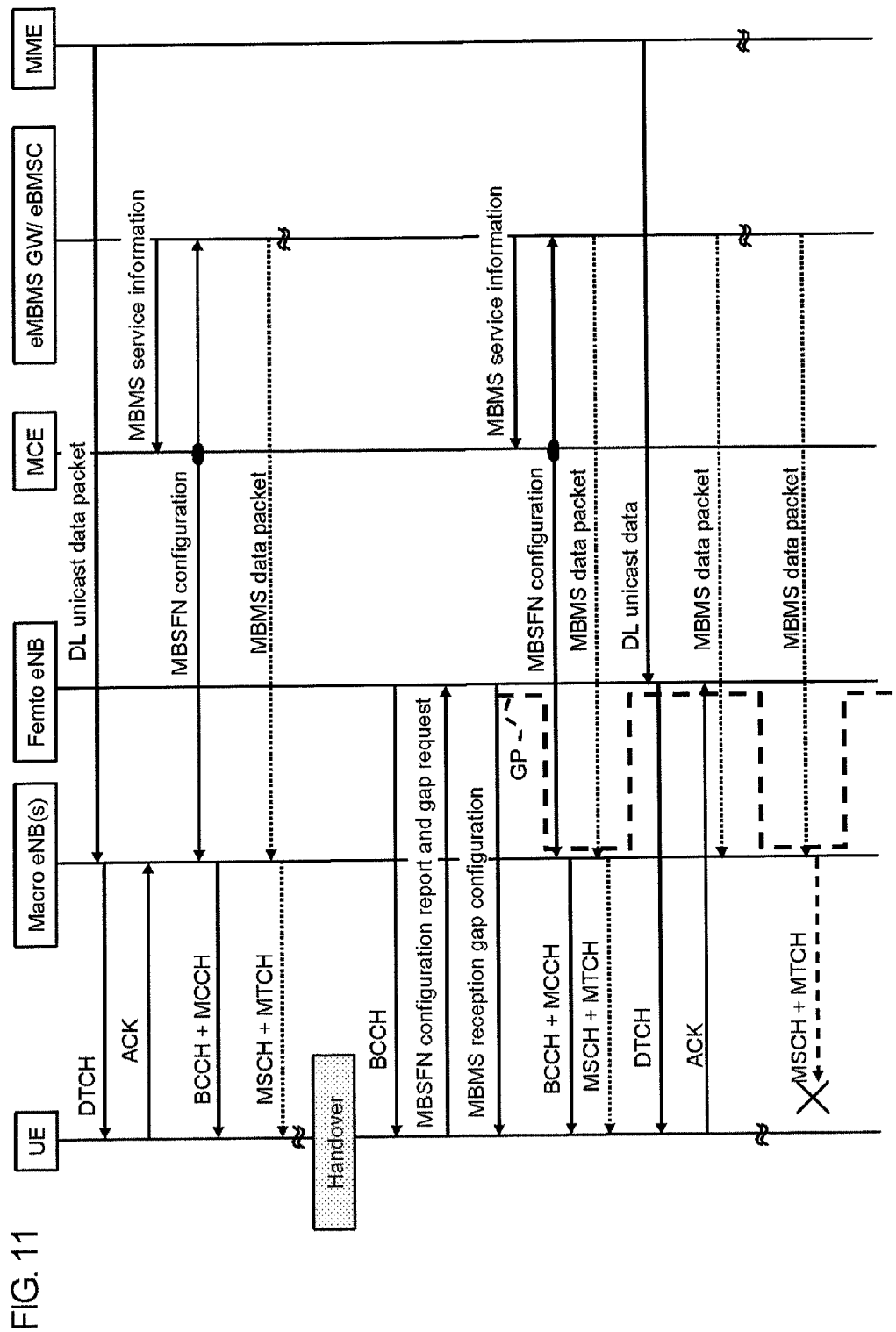
FIG. 11 is a diagram schematically illustrating a communication sequence of a wireless communication system according to a second embodiment of the invention.

Next, a second embodiment of the invention will be described. FIG. 11 is a diagram schematically illustrating a communication sequence of the wireless communication system 1 according to a second embodiment of the invention. In an initial state of the wireless communication system 1 according to the second embodiment, the radio terminal (UE) 40 serves to any one of the macro base stations 21, 22, and 23 while it is in an active state, communicates with this serving macro base station 21, and receives unicast data that is transmitted from the macro base station 21 via a dedicated traffic channel (DTCH). It is assumed that the radio terminal (UE) 40 also receives the service in an MBSFN manner from other macro base stations 22 and 23 which are different from the serving macro base station 21. As described later, in the second embodiment, the gap pattern GP is not configured by the radio terminal 40, but is configured by the femto base station 31.

As illustrated in FIG. 11, at a certain time, a terminal mobility management device (MME) 13 in FIG. 1 transmits a downlink data packet (DL (Down-Link) unicast data packet), which is to be transmitted to the radio terminal 40, to the macro base stations (macro eNBs) 21 to 23. The macro base stations 21 to 23 transmit the downlink data packet, which is received from the terminal mobility management device (MME) 13, to the radio terminal (UE) 40 using the dedicated traffic channel (DTCH). The radio terminal (UE) 40 may send an acknowledgement (ACK) reply to that transmission. Here, the radio terminal (UE) 40 may send a negative acknowledgement (NACK) reply instead of the ACK.

On the other hand, the broadcast/multicast service center (eBMSC) 10 notifies the multi-cell/multicast control device (MCE) 12 of MBMS service information via the MBMS gateway (eMBMS GW) 11. The multi-cell/multicast control device (MCE) 12 determines the MBSFN control information (MBSFN configuration) based on the MBSM service information that is received from the broadcast/multicast service center (eBMSC) 10, and notifies the broadcast/multicast service center (eBMSC) 10 and the macro base stations (macro eNBs) 21 to 23 of that control information. The macro base stations (macro eNBs) 21 to 23 transmit the MBSFN control information received from the multi-cell/multicast control device (MCE) 12 to the radio terminal (UE) 40 by using the BCCH and the MCCH.

Then, the broadcast/multicast service center (eBMSC) 10 transmits an MBMS data packet to the macro base stations (macro eNBs) 21 to 23 through the MBMS gateway (eMBMS GW) 11. The macro base stations (macro eNBs) 21 to 23 transmit the MBMS data packet received from the broadcast/multicast service center (eBMSC) 10 to the radio terminal (UE) 40 using the MSCH and the MTCH. As a result, the radio terminal (UE) 40 receives the MBMS data packets from the plurality of macro base stations (macro eNBs) 21 to 23 in an MBSFN manner.

If the radio terminal (UE) 40 detects that the received quality of the signal from the femto base station 31 that is not the serving base station of the radio terminal (UE) 40 is higher than the received quality of the signal from the macro base station 21 that is the current serving base station of the radio terminal (UE) 40 due to the movement of the radio terminal 40 or the change of a surrounding propagation environment, the radio terminal (UE) 40 changes the serving base station thereof from the macro base station 21 to the femto base station 31 by executing handover.

In the second embodiment, the femto base station 31 does not support the MBMS. Because of this, as illustrated in FIG. 11, the radio terminal 40 receives broadcast information that is transmitted from the femto base station (femto eNB) 31 that is the new serving base station via the BCCH, and recognizes that the MBMS data is not transmitted from the femto base station 31 based on the received broadcast information.

Then, the radio terminal 40 reports an MBSFN service configuration, which has been received from the macro base station (macro eNBs) 21 to 23, and performs a gap pattern request to the femto base station (femto eNB) 31. The femto base station 31 configures the gap pattern GP based on information on the transmission frequency or a transmission period of the DL unicast to the radio terminal 40 and scheduling information on data transmission timing and period of the MBSFN service which the radio terminal 40 desires (are interested) to receive. Also, the femto base station (femto eNB) 31 notifies the radio terminal 40 of information on the gap pattern GP (MBMS reception gap configuration).

The radio terminal (UE) 40 determines whether to receive a unicast signal from the femto base station 31 or an MBSFN signal from the macro base station 21 according to whether the gap pattern GP is active or inactive. If the gap pattern GP is inactive, as illustrated in FIG. 11, the radio terminal (UE) 40 receives the DL Unicast data that is transmitted from the femto base station (femto eNB) 31 via the DTCH. While, if the gap pattern GP is in an active period Tactive, the radio terminal (UE) 40 receives the MBSFN control information (MBSFN configuration) that is transmitted from the macro base stations (macro eNBs) 21 to 23 via the BCCH and the MCCH, and receives the MBMS data packet by the MBSFN that is transmitted via the MSCH and the MTCH. Accordingly, the radio terminal (UE) 40 in an active state can continuously receive the service by the MBSFN even after handover from the macro base station 21 that supports the MBMS to the femto base station 31 that does not support the MBMS.

Figure 12:
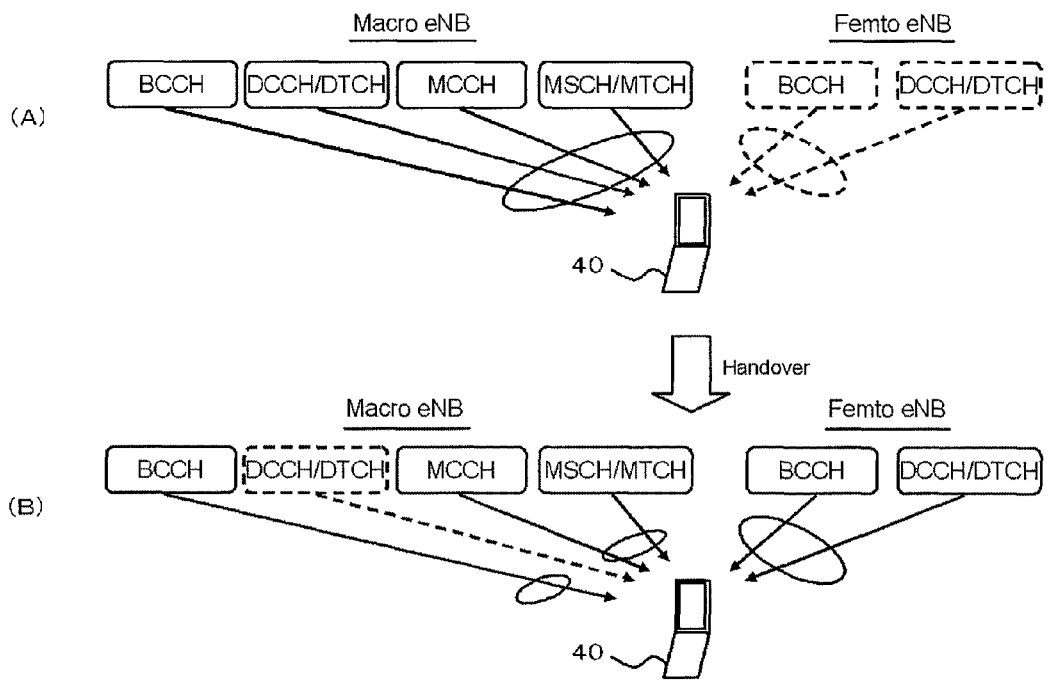
FIG. 12 is a diagram illustrating an example of a reception state of a radio terminal.

As illustrated in FIG. 12(A), before the handover is executed, the radio terminal 40 in the active state receives broadcast information, unicast data, and MBMS data that are transmitted from the macro base stations (macro eNBs) 21 to 23 via the BCCH, DCCH and DTCH, MCCH, MSCH and MTCH. Here, the radio terminal 40 does not basically receive the signal transmitted from the femto base station (femto eNB) 31 via the BCCH, DCCH, and DTCH.

On the other hand, as illustrated in FIG. 12(B), when the handover has been executed, the radio terminal 40 receives signals, which are transmitted from the macro base stations (macro eNBs) 21 to 23 via the BCCH, MCCH, MSCH, and MTCH while the gap pattern GP is in an active period Tactive. While the gap pattern GP is in an inactive period Tinactive, the radio terminal 40 receives the signals, which are transmitted from the femto base station (femto eNB) 31 via the BCCH, DCCH, and DTCH.

Figure 13:
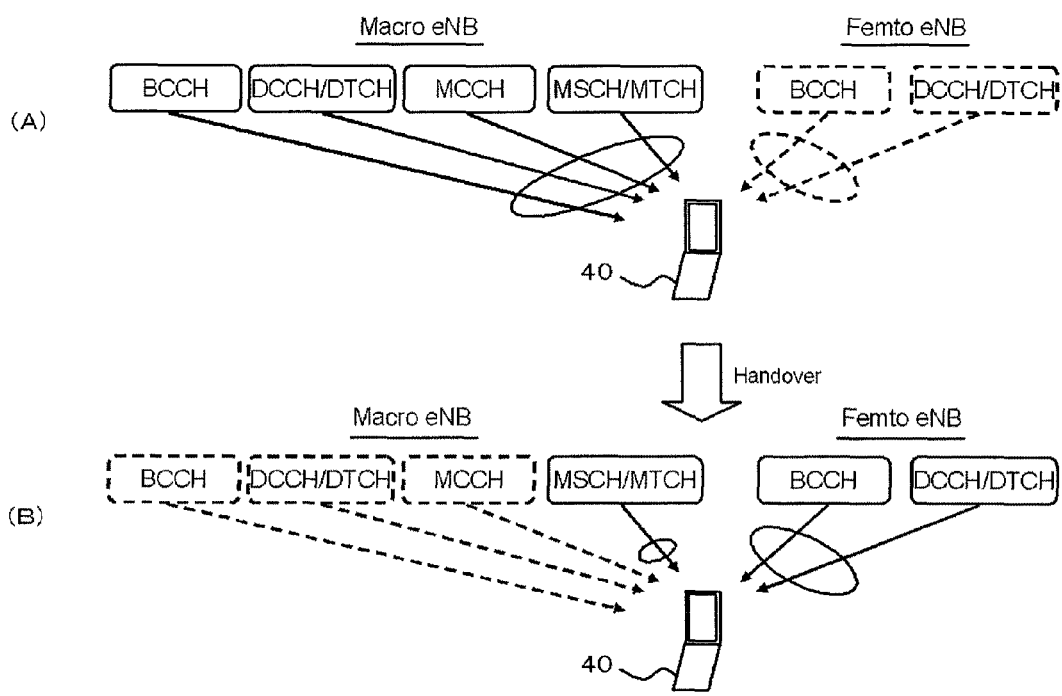
FIG. 13 is a diagram illustrating another example of a reception state of a radio terminal.

Here, instead of the receiving status of the radio terminal 40 as illustrated in FIGS. 12(A) and (B), the receiving status as illustrated in FIGS. 13(A) and (B) may be adopted. That is, before the handover is executed, the receiving status of FIG. 13(A) is the same as the receiving status of FIG. 12(A). If the handover has been executed, as illustrated in FIG. 13(B), during the active period Tactive, the communication control unit 42 of the radio terminal 40 holds the MBSFN control information and receives only the signals that are transmitted via the MSCH and MTCH. In this case, when the MBSFN control information is modified, the radio terminal 40 cannot continuously receive the service by the MBMS. However, even in the case where the MBSFN control information is modified and thus the service by the MBMS cannot be continuously received, the radio terminal 40 may resume to receive the signals via the BCCH and MCCH in order to receive the MBSFN control information.

Figure 14:
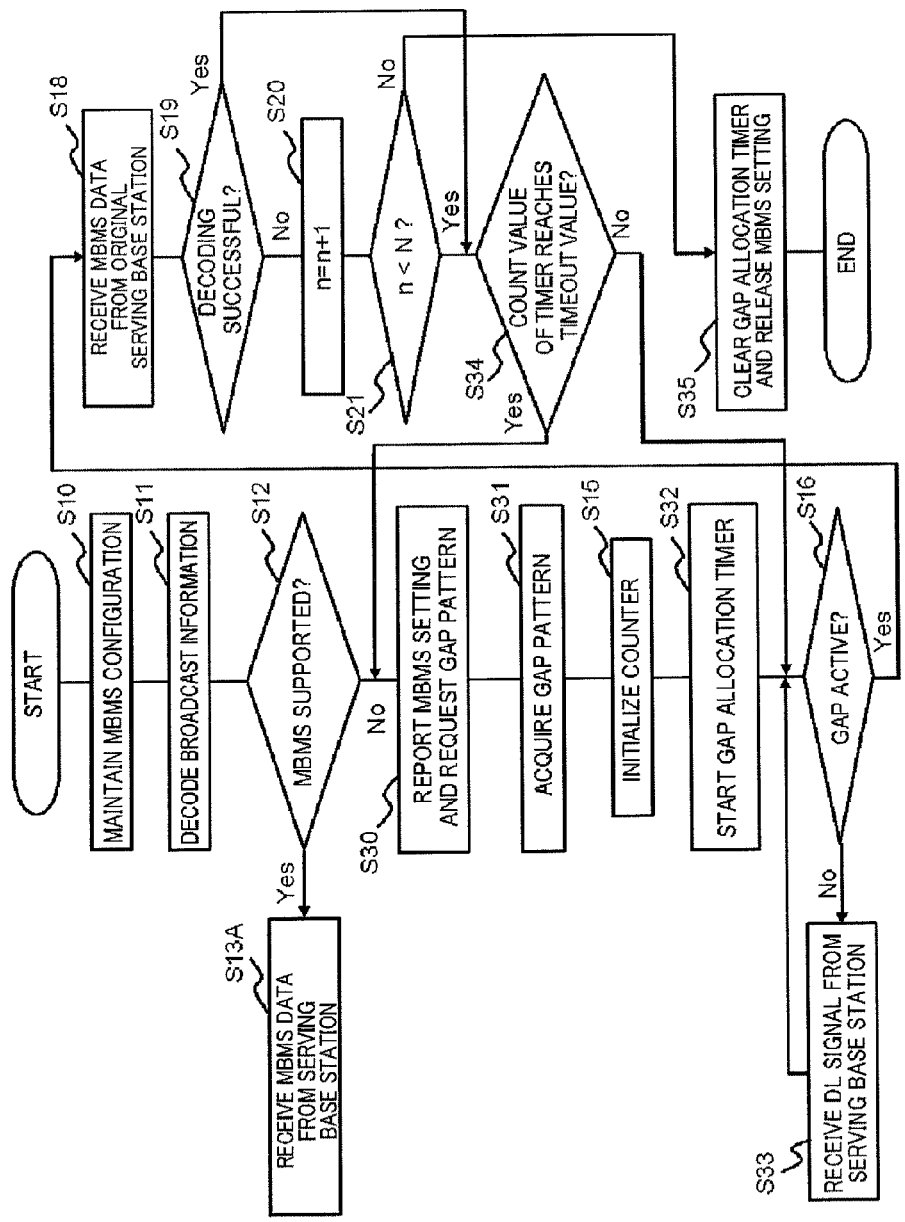
FIG. 14 is a flowchart schematically illustrating an operation procedure of a radio terminal after handover.
Figure 15:
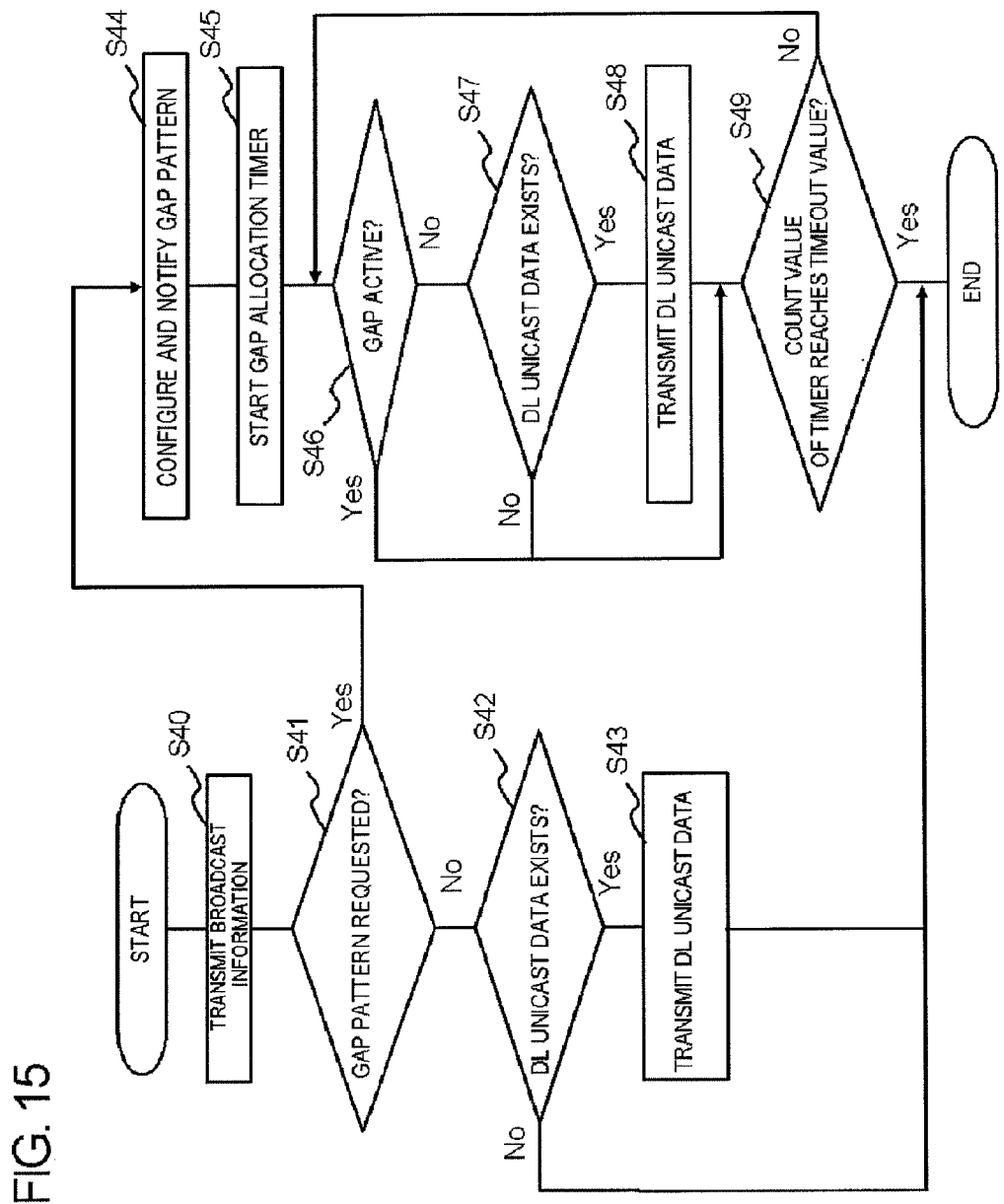
FIG. 15 is a flowchart schematically illustrating an operation procedure of a femto base station after handover.

Next, referring to FIGS. 14 and 15, the operation of the radio terminal 40 and the operation of the femto base station 31 after the handover will be described. FIG. 14 is a flowchart schematically illustrating an operation procedure of the radio terminal 40 after the handover, and FIG. 15 is a flowchart schematically illustrating an operation procedure of the femto base station 31 after the handover. In this embodiment, the femto base station 31 configures the gap pattern GP, and a gap allocation timer is used for determining whether the gap pattern GP is available.

As illustrated in FIG. 14, the communication control unit 42 of the radio terminal 40 first receives MBMS control information (MBMS configuration) from the macro base station 21 before the handover, and maintains the configuration sent in the MBMS control information (step S10). Then, the receiver 41B receives the broadcast information that is transmitted from the macro base station 21 via the BCCH and decodes the broadcast information (step S11) after the handover.

Thereafter, the communication control unit 42 determines whether the femto base station 31 that has transmitted the broadcast information supports the MBMS (step S12). If the femto base station 31 supports the MBMS ("YES" in step S12), the communication control unit 42 receives the MBMS data from the serving femto base station 31 in order to receive the service by the normal MBMS (step S13A).

If the femto base station 31 does not support the MBMS ("NO" in step S12), the communication control unit 42 reports the configuration status based on the MBMS control information (MBMS configuration) to the femto base station 31 and performs a gap request, that is, a request for configuring the gap pattern GP to the femto base station 31 (step S30). Thereafter, the radio terminal 40 receives the information on the gap pattern GP (MBMS reception gap configuration) and a gap allocation timer value from the femto base station 31 and prepares for starting the gap allocation timer (step S31).

Thereafter, the communication control unit 42 starts the counter and initialize the count value n of this counter (step S15). This counter is to determine whether the radio terminal 40 is out-of-service. Further, the communication control unit 42 starts the gap allocation timer (step S32). Accordingly, the gap allocation timer starts counting.

Next, the communication control unit 42 determines whether the gap is active or inactive, that is, whether the current time is in an active period Tactive of the gap pattern GP or in an inactive period Tinactive of the gap pattern GP (step S16). If the gap is inactive ("NO" in step S16), the communication control unit 42 receives the downlink signal (DL signal) from the serving femto base station 31 (step S33).

If the gap is active ("YES" in step S16), the communication control unit 42 receives MBMS data from the macro base station to which the radio terminal 40 served before the handover or other surrounding macro base station (step S18). As a result, the radio terminal 40 can receive an MBMS data packet from the macro base station to which the radio terminal 40 served before the handover or other surrounding macro base stations.

Then, if decoding of the MBMS data is successful ("YES" in step S19), the communication control unit 42 determines that the MBMS data has been successfully received, and makes the transition to the process in step S34.

On the other hand, if the decoding of the MBMS data fails ("NO" in step S19), the counter increments the count value n (step S20), and the communication control unit 42 determines whether the count value n is less than a set value N (step S21). If the count value n does not reach the set value N ("YES" in step S21), the communication control unit 42 determines whether the count value of the gap allocation timer reaches the timeout value (step S34).

If the count value of the gap allocation timer reaches the timeout value ("NO" in step S34), the communication control unit 42 returns the process to step S30. On the other hand, if the count value of the gap allocation timer does not reach the timeout value ("NO" in step S34), the communication control unit returns the process to step S16.

If it is determined that the count value n reaches the set value N in step S21 ("NO" in step S21), the communication control unit 42 clears the count value of the gap allocation timer and releases the MBMS setting (MBMS configuration) (step S35), and determines that the radio terminal 40 is out-of-service to finish the communication control.

Next, with reference to FIG. 15, the operation of the femto base station 31 will be described.

As illustrated in FIG. 15, the femto base station 31 first transmits the broadcast information to the radio terminal 40 that serves to the femto base station 31 (step S40). Then, the femto base station 31 determines whether the gap request is received from the radio terminal 40 (step S41).

If the gap request is not received from the radio terminal 40 ("NO" in step S41), the femto base station 31 checks the existence/nonexistence of the DL unicast data (step S42). If it is determined that the DL unicast data exists ("YES" in step S42), the femto base station 31 performs the scheduling and transmits the DL unicast data to the radio terminal 40 via the DTCH (step S43). That is, the femto base station 31 executes the same procedure as the transmission produce of the normal unicast data. On the other hand, if it is determined that the DL unicast data does not exist ("NO" in step S42), the femto base station 31 finishes the process.

If the femto base station 31 has received the gap request from the radio terminal 40 in step S41 ("YES" in step S41), the femto base station 31 configures the gap pattern GP according to this request, and notifies the radio terminal 40 of the information on the gap pattern GP (step S44). Thereafter, the femto base station 31 starts the built-in gap allocation timer to start the counting operation (step S45).

Then, the femto base station 31 determines whether the gap is active or inactive, that is, whether the current time is in an active period Tactive or in an inactive period Tinactive of the gap pattern GP (step S46). If the gap is inactive ("NO" in step S46), the femto base station 31 checks the existence/nonexistence of the DL unicast data (step S47). If the DL unicast data exists ("YES" in step S47), the femto base station 31 executes the scheduling and transmits the unicast data to the radio terminal 40 (step S48).

If the gap is active in step S46, or if it is determined that the DL unicast data does not exist in step S47 ("NO" in step S47), the femto base station 31 determines whether the count value of the gap allocation timer reaches the timeout value (step S49). If the count value of the gap allocation timer reaches the timeout value ("YES" in step S49), the femto base station 31 finishes the process. Thereafter, the femto base station 31 performs the same operation as the normal DL unicast. On the other hand, if the count value of the gap allocation timer does not reach the timeout value ("NO" in step S49), the femto base station 31 returns the process to step S46.

Although the gap allocation timer is used in the flowchart of FIG. 15, there may be another embodiment where the gap allocation timer is not used. Similarly, there may be another embodiment where the counter is not used, but only the gap allocation timer is used.

Third Embodiment

Figure 16:
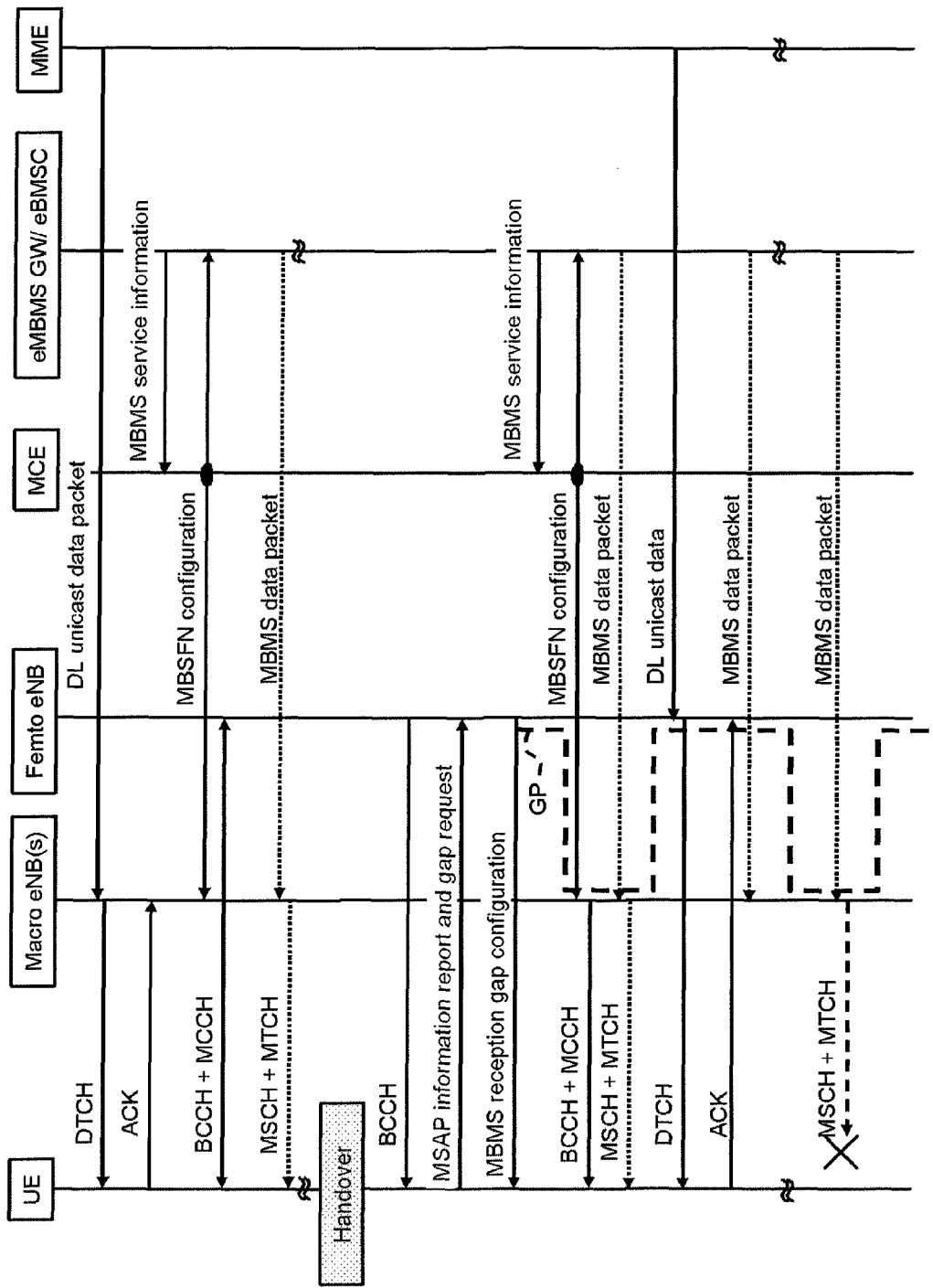
FIG. 16 is a diagram schematically illustrating a communication sequence of a wireless communication system according to a third embodiment of the invention.

Next, a third embodiment of the invention will be described. FIG. 16 is a diagram schematically illustrating a communication sequence of the wireless communication system 1 according to a third embodiment. In an initial state of the wireless communication system 1 in this embodiment, the radio terminal (UE) 40 serves to one (for example, the macro base station 21) of the macro base stations 21, 22, and 23 and it is in an active state. If the serving base station is the macro base station 21, the radio terminal (UE) 40 communicates with the macro base station 21. Also, it is assumed that the radio terminal (UE) 40 also receives the MBSFN service from serving macro base stations and surrounding macro base stations in addition to the Unicast service.

In the third embodiment, (1) the femto base station 31 receives the MBSFN control information (MBSFN configuration) from the macro base stations 21 to 23 at a time point before the radio terminal (UE) 40 executes the handover, (2) the radio terminal (UE) 40 transmits the information that is related to the service, which was being received before the handover, to the femto base station 31, and (3) the femto base station 31 configures the gap pattern GP by using the information that is transmitted from the radio terminal (UE) 40 and the MBSFN control information that is received from the macro base stations 21 to 23. The information which the radio terminal (UE) 40 transmits to the femto base station 31 may be, for example, information that is related to the service which the radio terminal 40 actually was receiving (for example, an MSAP index) among MCH subframe allocation pattern (MSAP) information that is used in the "3GPP LTE" or an equivalent thereof.

As illustrated in FIG. 16, at a certain time, the terminal mobility management device (MME) 13 of FIG. 1 transmits a downlink data (DL unicast data packet) of the radio terminal 40 to the macro base stations (macro eNBs) 21. The macro base station 21 transmits the downlink data, which is received from the terminal mobility management device (MME) 13, to the radio terminal (UE) 40 via the dedicated traffic channel (DTCH).

On the other hand, the broadcast/multicast service center (eBMSC) 10 notifies the multi-cell/multicast control device (MCE) 12 of MBMS service information through the MBMS gateway (eMBMS GW) 11. The multi-cell/multicast control device (MCE) 12 determines the MBSFN control information (MBSFN configuration) based on the MBMS service information that is received from the broadcast/multicast service center (eBMSC) 10, and notifies the broadcast/multicast service center (eBMSC) 10 and the macro base stations (macro eNBs) 21 to 23 of that control information. The macro base stations (macro eNBs) 21 to 23 transmit the MBSFN control information received from the multi-cell/multicast control device (MCE) 12 to the radio terminal (UE) 40 via the BCCH and the MCCH.

In this case, the femto base station 31 receives a part of the MBSFN control information via the BCCH of the macro base stations (macro eNBs) 21 to 23, or the MBSFN control information (MBSFN configuration) via both the BCCH and MCCH of the macro base station (macro eNBs) 21 to 23.

On the other hand, the broadcast/multicast service center (eBMSC) 10 transmits an MBMS data packet to the macro base stations (macro eNBs) 21 to 23 through the MBMS gateway (eMBMS GW) 11. The macro base stations (macro eNBs) 21 to 23 transmit the MBMS data packet received from the broadcast/multicast service center (eBMSC) 10 to the radio terminal (UE) 40 using the MSCH and the MTCH. As a result, the radio terminal (UE) 40 receives the MBMS data packets from the plurality of macro base stations (macro eNBs) 21 to 23 in an MBSFN manner.

If the radio terminal (UE) 40 detects that the received quality of the signal from the femto base station 31 that is not the serving base station of the radio terminal (UE) 40 is higher than the received quality of the signal from the macro base station 21 that is the current serving base station of the radio terminal (UE) 40 due to the movement of the radio terminal 40 or the change of a surrounding propagation environment, the radio terminal (UE) 40 changes the serving base station thereof from the macro base station 21 to the femto base station 31 by handover.

In this embodiment, the femto base station 31 does not support the MBMS. Therefore, the radio terminal (UE) 40 receives broadcast information that is transmitted from the femto base station 31 via the BCCH, and recognizes that the MBMS data is not delivered from the femto base station 31 based on the broadcast information.

Then, the radio terminal 40 performs an MBSFN service configuration report (MSAP information report), which has been received from the macro base station (macro eNBs) 21 to 23, and a gap pattern request to the femto base station (femto eNB) 31. The femto base station 31 configures the gap pattern GP based on information on a transmission frequency or a transmission period of the DL unicast data to the radio terminal 40 and scheduling information on data transmission period of the MBSFN service which the radio terminal 40 is interested to receive. Also, the femto base station (femto eNB) 31 notifies the radio terminal 40 of information on the gap pattern GP (MBMS reception gap configuration).

The radio terminal (UE) 40 determines whether to receive a unicast signal from the femto base station 31 or an MBSFN signal from the macro base station 21 according to whether the gap pattern GP is in an active period or an inactive period. If the gap pattern GP is in the inactive period, as illustrated in FIG. 16, the radio terminal (UE) 40 receives the DL Unicast data that is transmitted from the femto base station (femto eNB) 31 via the DTCH. On the other hand, if the gap pattern GP is in an active period Tactive, the radio terminal (UE) 40 receives the MBMS data packet by the MBSFN from the macro base stations (macro eNBs) 21 to 23. Also, the radio terminal (UE) 40 receives the MBSFN control information (MBSFN configuration) from the macro base stations (macro eNBs) 21 to 23 via the BCCH and MCCH. Accordingly, the radio terminal 40 in the active state can continuously receive the MBSFN service even after the handover from the macro base station 21 that supports the MBMS to the femto base station 31 that does not support the MBMS.

As described above, since the femto base station 31 receives the MBSFN control information (MBSFN configuration) from the macro base stations 21 to 23, the information amount of the report regarding the MBSFN control information that is transmitted from the radio terminal 40 can be greatly reduced.

Figure 17:
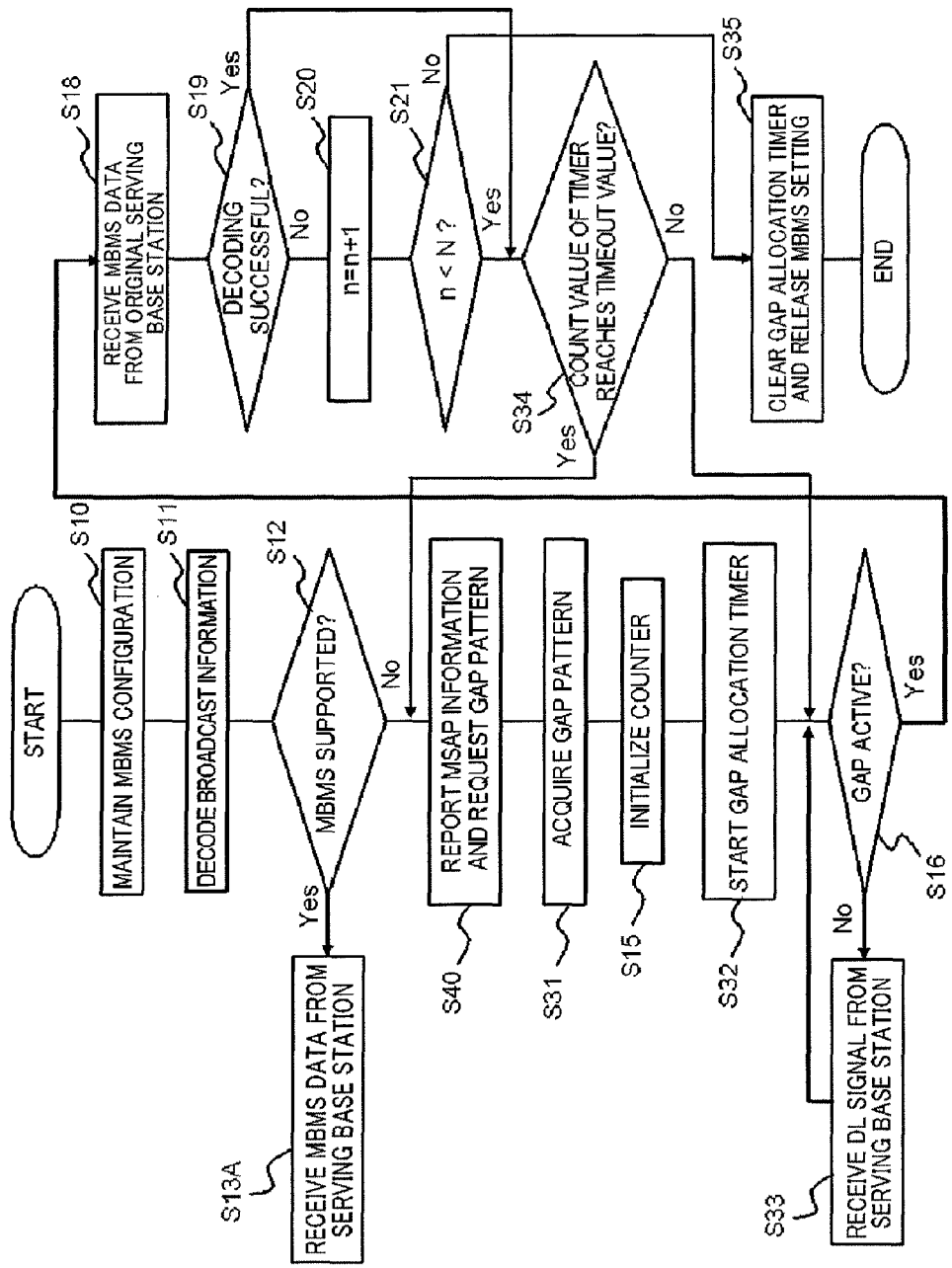
FIG. 17 is a flowchart schematically illustrating an operation procedure of a radio terminal after handover.
Figure 18:
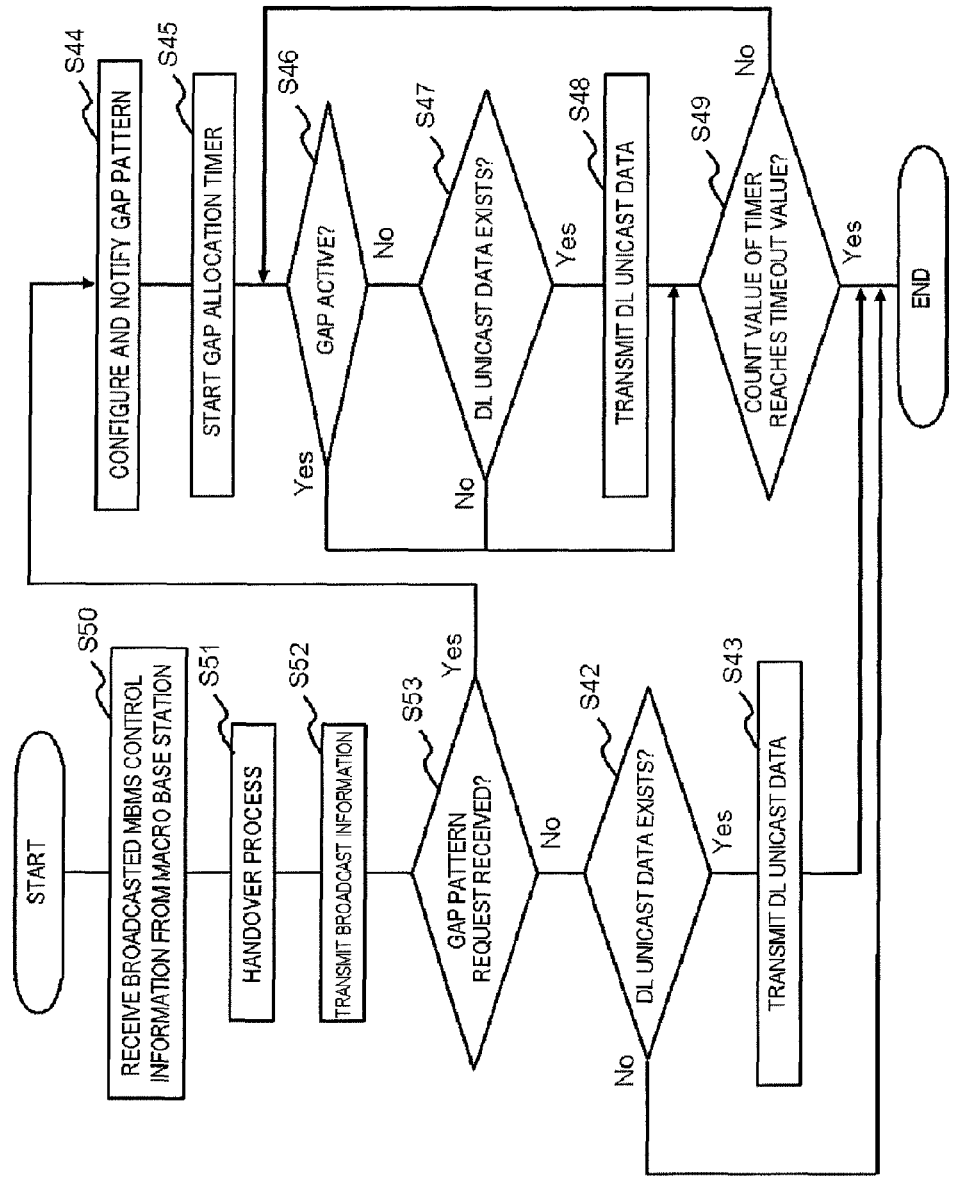
FIG. 18 is a flowchart schematically illustrating an operation procedure of a femto base station after handover.

Next, referring to FIGS. 17 and 18, the operation of the radio terminal 40 and the operation of the femto base station 31 after the handover will be described. FIG. 17 is a flowchart schematically illustrating an operation procedure of the radio terminal 40 after the handover, and FIG. 18 is a flowchart schematically illustrating an operation procedure of the femto base station 31 after the handover.

In this embodiment, the femto base station 31 configures the gap pattern GP, and a gap allocation timer for indicating its valid period is used. Although it is assumed that the serving base station of the radio terminal 40 after the handover is the femto base station 31, the serving base station may be a micro base station or a pico base station if the serving base station has a function of receiving the downlink signal from the macro base stations 21 to 23, instead of the femto base station 31.

As illustrated in FIG. 17, the communication control unit 42 of the radio terminal 40 first receives MBMS control information (MBMS configuration) from the macro base station 21 before the handover, and maintains the configuration based on the MBMS control information (step S10). Then, the receiver 41B receives the broadcast information that is transmitted from the macro base station 21 via the BCCH after the handover, and decodes the broadcast information (step S11). Thereafter, the communication control unit 42 determines whether the femto base station 31 that has transmitted the broadcast information supports the MBMS (step S12). If the femto base station 31 supports the MBMS ("YES" in step S12), the communication control unit 42 receives the MBMS data from the serving femto base station 31 so as to receive the normal MBMS service (step S13A).

On the other hand, if the femto base station 31 does not support the MBMS ("NO" in step S12), the communication control unit 42 performs a report of the MSAP information and a gap pattern request to the serving femto base station (step S40). Thereafter, the information on the gap pattern GP (MBMS reception gap configuration) and the information on the gap allocation timer are received from the femto base station 31 (step S31).

Thereafter, the communication control unit 42 starts the counter and initialize the count value n of this counter (n=0) (step S32), and activates the gap allocation timer and start the count operation (step S32).

Next, the communication control unit 42 determines whether the gap is active or inactive, that is, whether the current time is in an active period Tactive of the gap pattern GP or in an inactive period Tinactive of the gap pattern GP (step S16). If the gap is inactive ("NO" in step S16), the communication control unit 42, as needed, receives the downlink signal (DL signal) from the serving femto base station 31 (step S33).

On the other hand, if the gap is active ("YES" in step S16), the communication control unit 42 receives MBMS data from the macro base station to which the radio terminal 40 served before the handover or other surrounding macro base stations (step S18). As a result, the radio terminal 40 can receive an MBMS data packet from the macro base station to which the radio terminal 40 served before the handover or other surrounding macro base station.

Then, if decoding of the MBMS data is successful ("YES" in step S19), the communication control unit 42 determines that the MBMS data has been successfully received, and makes the transition to the process in step S34.

On the other hand, if the decoding of the MBMS data fails ("NO" in step S19), the counter increments the count value n (step S20), and the communication control unit 42 determines whether the count value n is less than a set value N (step S21). If the count value n does not reach the set value N ("YES" in step S21), the communication control unit 42 determines whether the count value of the gap allocation timer reaches the timeout value (step S34).

If the count value of the gap allocation timer reaches the timeout value ("NO" in step S34), the communication control unit 42 returns the process to step S40. On the other hand, if the count value of the gap allocation timer does not reach the timeout value ("YES" in step S34), the communication control unit 42 returns the process to step S16.

If it is determined that the count value n reaches the set value N in step S21 ("YES" in step S21), the communication control unit 42 clears the count value of the gap allocation timer and releases the MBMS setting (MBMS configuration) (step S35), and determines that the radio terminal 40 is out-of-service to finish the communication control.

Next, with reference to FIG. 18, the operation of the femto base station 31 that is the handover destination of the radio terminal 40 will be described. As illustrated in FIG. 18, the femto base station 31 receives the MBMS control information (MBMS configuration) that is broadcasted from the macro base stations 21 to 23 regardless of whether or not the radio terminal 40 performs the handover (step S50). After the handover process (step S51), the femto base station 31 transmits the broadcast information (step S52) as a normal operation, and determines whether the gap request has been received from the radio terminal 40 (step S53).

The case where the femto base station 31 receives the MBMS control information of the macro base station 21 may include a case where the reception is performed just after the femto base station 31 is activated (i.e. starts operation), a case where the reception is performed when there is no radio terminal in an active state, or a case where the reception is performed in a predetermined period after the activation. In this case, a protection process such as deactivating the received information after a predetermined time elapses after the reception of the information may be introduced. Also, the predetermined time may be shorter or longer than the time until the protection process is executed.

If the gap request is not received from the radio terminal 40 ("NO" in step S53), the femto base station 31 checks the existence/nonexistence of the DL unicast data (step S42). If it is determined that the DL unicast data exists ("YES" in step S42), the femto base station 31 performs the scheduling and transmits the DL unicast data to the radio terminal 40 via the DTCH (step S43). That is, the femto base station 31 executes the same procedure as the transmission procedure of the normal Unicast data. On the other hand, if it is determined that the DL Unicast data does not exist ("NO" in step S42), the femto base station 31 finishes the process.

If the femto base station 31 has received the gap request from the radio terminal 40 in step S41 ("YES" in step S53), the femto base station 31 configures the gap pattern GP according to this request, and notifies the radio terminal 40 of the information of the gap pattern GP and the information of the gap allocation timer (step S44). The following procedure is the same as the procedure in steps S45 to S49 in FIG. 15, the detailed explanation thereof will not be repeated.

In this embodiment, the radio terminal 40 reports the MSAP information assuming the MBSFN (step S40). However, the radio terminal 40 may report the information that indicates the radio resource information of the service which had been received before the handover instead of the MSAP information. Accordingly, even in the case of receiving a signal by a general MBMS service, it is possible to apply the method according to this embodiment thereto.

Although the gap allocation timer is used in the flowchart of FIG. 18, there may be a case where the gap allocation timer is not used. Similarly, there may be a case where the counter is not used, but only the gap allocation timer is used.

In the case of the LTE, the basic information sent via BCCH is divided into a set of minimum essential information that is called a Master Information Block (MIB) and a set of other information that is called a System Information Block (SIB). The MIB consists of, for example, a downlink system bandwidth (dl-SystemBandwidth), a system frame number (systemFrameNumber), and the like. On the other hand, the SIB consists of, for example, information on cell access restriction (i.e. access barring) (cellBarred), a system information tag (systemInformationValueTag), common cell reselection information (cellReselectionInfoCommon), and neighbouring cell information (neighbourCellConfiguration). The MBMS information sent via BCCH consists of, for example, information on MBSFN subframe setting (mbsfn-SubframeConfiguration), information on MBSFN frame allocation (radioFrameAllocation), and information on MBSFN subframe allocation (subframeAllocation).

Also, in the third embodiment, the femto base station (femto eNB) 31 receives the signals transmitted from the macro base station 21 via the BCCH and MCCH, and the radio terminal 40 transmits a gap request (MSAP information report and gap request). Note that if the femto base station 31 does not receive the signal from the macro base station 21 via the BCCH and MCCH or the femto base station 31 had received the signal from the macro base station 21 via the BCCH and MCCH, but the information in the received signal is old (e.g. after a predetermined time elapses), additional information may be requested to the radio terminal 40. The gap request (MSAP information report and gap request) may be transmitted by using a radio resource that is the same as other information transmitted during a normal handover or a radio resource that is newly requested after the completion of the handover.

Modified Example of the Third Embodiment

Figure 19:
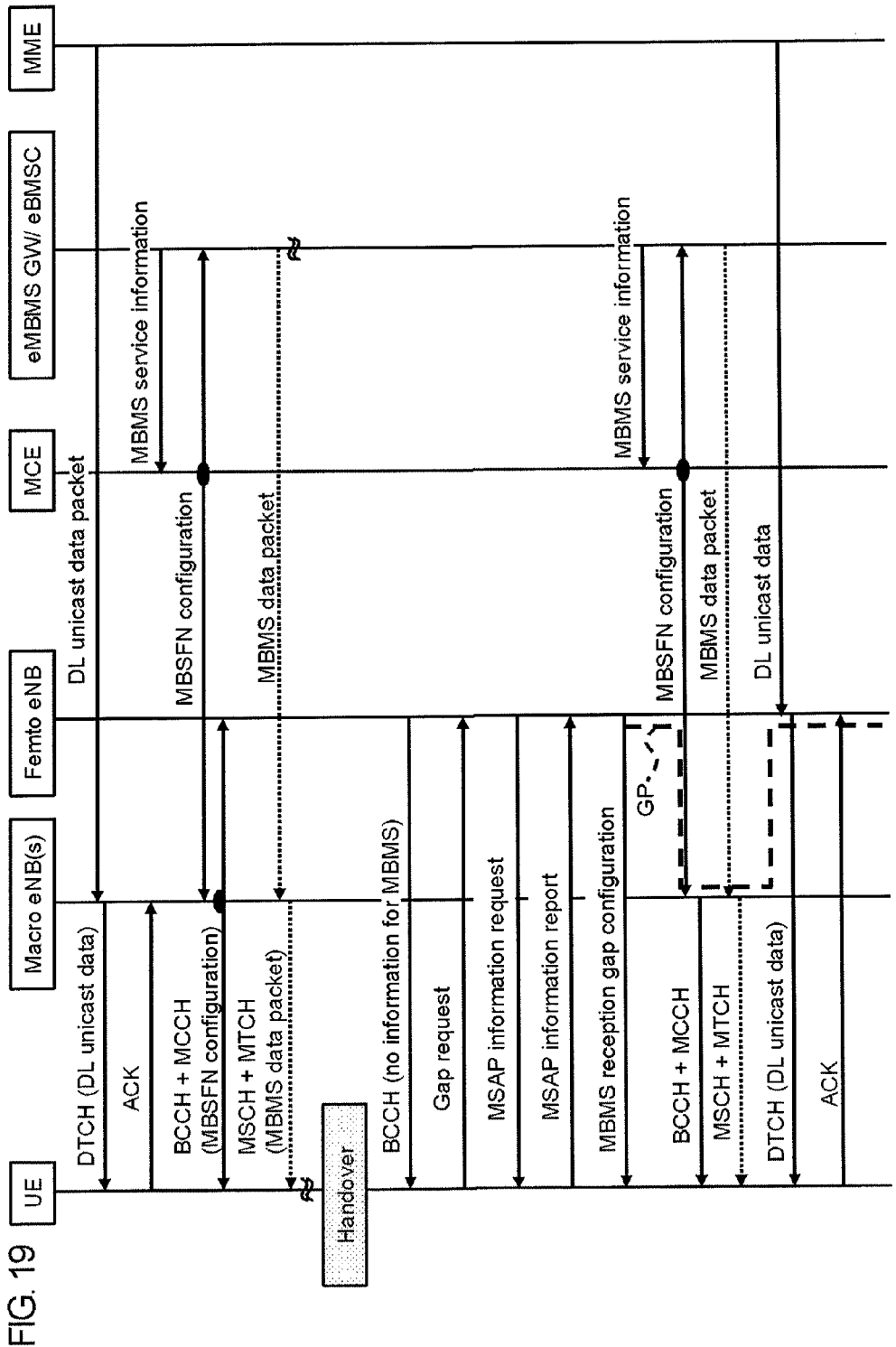
FIG. 19 is a diagram schematically illustrating a communication sequence of a wireless communication system according to a modified example of the third embodiment of the invention.

FIG. 19 is a diagram illustrating a communication sequence according to a modified example of the third embodiment of the invention. As illustrated in FIG. 19, the femto base station (femto eNB) 31 receives the MBMS (MBSFN) configuration that is transmitted from the macro base stations (macro eNBs) 21 to 23 via the BCCH and MCCH. Next, the radio terminal (UE) 40 transmits a request for a gap pattern GP (gap request) to the femto base station 31 after the handover.

According to this request, the femto base station (femto eNB) 31 requests information that is required to configure the gap pattern GP (MSAP information request) to the radio terminal (UE) 40. This kind of information may be, for example, MSAP information, but is not limited thereto. The information may be MBSFN scheduling information or information related to the MBSFN scheduling information. The radio terminal (UE) 40 transmits the requested information (for example, MSAP information) to the femto base station (femto eNB) 31 (MSAP information report).

Also, the femto base station (femto eNB) 31 configures the gap pattern GP based on the MBMS (MBSFN) control information received from the macro base stations (macro eNBs) 21 to 23 and the information (for example, MSAP information) transmitted (reported) from the radio terminal (UE) 40, and transmits (notifies) the configuration information to the radio terminal (UE) 40.

In this case, the gap request (MSAP information report and gap request) may be transmitted by using a radio resource that is the same as other information transmitted when a normal handover or a radio resource that is newly requested after the completion of the handover.

Fourth Embodiment

Next, a fourth embodiment of the invention will be described. In the first to third embodiments, it is assumed that the radio terminal 40 changes the serving base station from the base station (for example, macro base station 21) that supports the MBMS to the base station (for example, femto base station 31) that does not support the MBMS. The fourth embodiments to be described hereinafter provides a configuration which enables the radio terminal 40 to receive the MBMS service from the surrounding base station that supports the MBMS while the radio terminal 40 serves to the base station that does not support the MBMS without handover or cell reselection.

Figure 20:
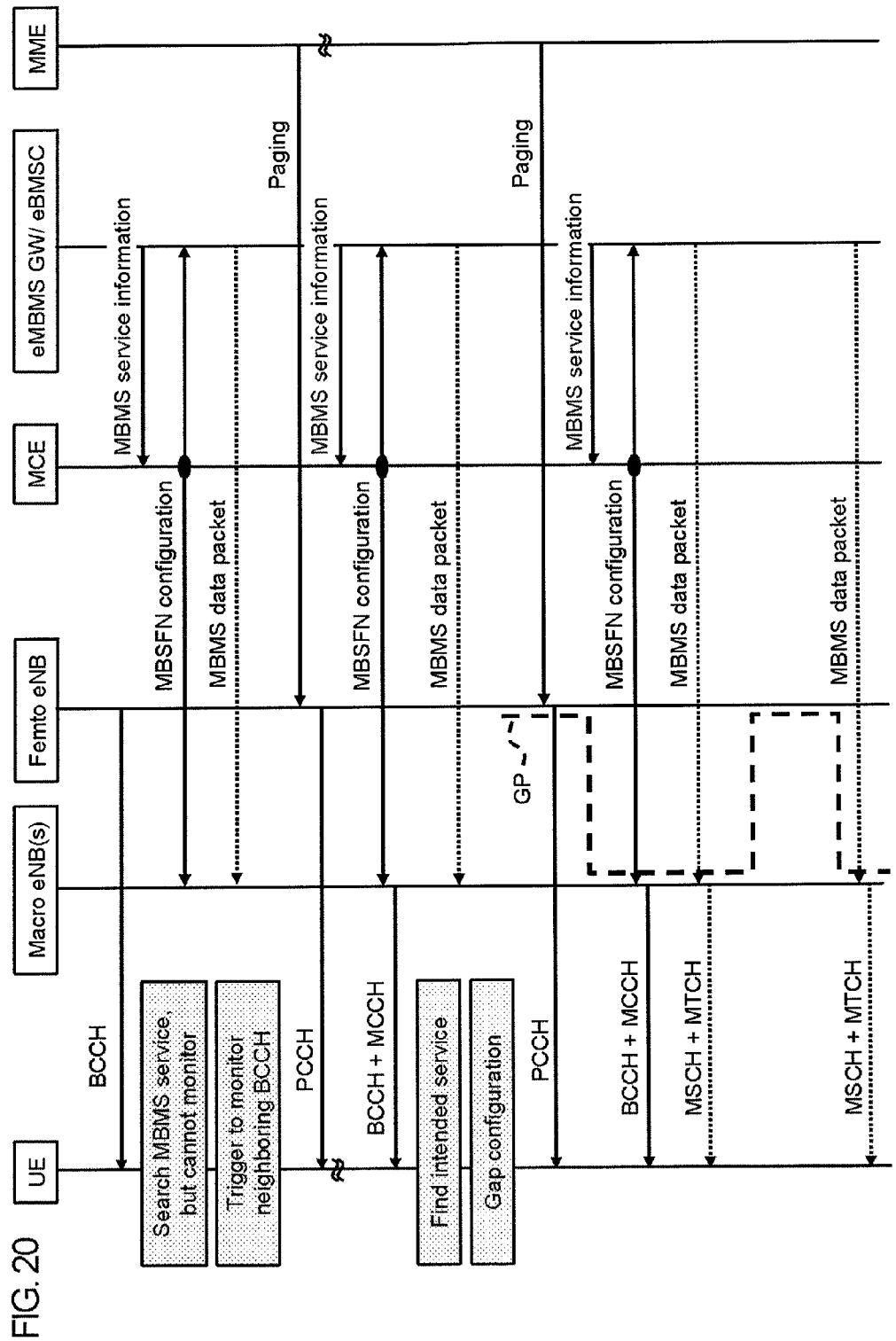
FIG. 20 is a diagram schematically illustrating a communication sequence of a wireless communication system according to a fourth embodiment of the invention.

FIG. 20 is a diagram schematically illustrating a communication sequence of the wireless communication system 1 according to a fourth embodiment. In an initial state of the wireless communication system 1 in the fourth embodiment, the radio terminal (UE) 40 serves to the femto base station (femto eNB) 31 while it is in an idle state. It is assumed that the radio terminal (UE) 40 does not receive individual (dedicated) information from channels except for the BCCH.

On the other hand, the broadcast/multicast service center (eBMSC) 10 notifies the multi-cell/multicast control device (MCE) 12 of MBMS service information through the MBMS gateway (eMBMS GW) 11. The multi-cell/multicast control device (MCE) 12 determines the MBSFN control information (MBSFN configuration) based on the MBMS service information that is received from the broadcast/multicast service center (eBMSC) 10, and notifies the broadcast/multicast service center (eBMSC) 10 and the macro base stations (macro eNBs) 21 to 23 of that control information. Although not illustrated, the macro base stations (macro eNBs) 21 to 23 transmit the MBSFN control information received from the multi-cell/multicast control device (MCE) 12 to the radio terminal (UE) 40 under the control of the base station itself via the BCCH and the MCCH.

On the other hand, the broadcast/multicast service center (eBMSC) 10 transmits an MBMS data packet to the macro base stations (macro eNBs) 21 to 23 through the MBMS gateway (eMBMS GW) 11. Although not illustrated, the macro base stations (macro eNBs) 21 to 23 transmit the MBMS data packet received from the broadcast/multicast service center (eBMSC) 10 to the radio terminal (UE) 40 under the control of the base station itself via the MSCH and the MTCH.

At a certain time, the radio terminal (UE) 40 intends to receive the MBMS service, but cannot receive the MBMS data from the serving femto base station 31 ("search MBMS service, but cannot monitor"). In the case where the radio terminal (UE) 40 detects that the serving base station does not support the MBMS based on the broadcast information ("trigger to monitor neighboring BCCH"), the radio terminal (UE) 40 receives the broadcast information that is transmitted via the BCCH of another neighboring base station. In this way, the radio terminal (UE) 40 searches whether or not the neighbouring macro base stations 21 to 23 support the MBMS.

In the case where the radio terminal (UE) 40 detects that a desired service is delivered from any one of the macro base stations, the radio terminal (UE) configures the gap pattern GP. The radio terminal (UE) 40 receives data (signal) of the MBMS service that is provided from the macro base stations (macro eNBs) 21 to 23 while the gap pattern GP is in an active period. On the other hand, the radio terminal (UE) 40 receives the signal that is transmitted via the PCCH from the femto base station 31 while the gap pattern GP is in an inactive period. Accordingly, the radio terminal 40 can start reception of the MBSFN service from the macro base station that supports the MBMS even if the radio terminal 40 serves to the femto base station 31 that does not support the MBMS.

Also note that the gap pattern GP may be configured at the time when the radio terminal (UE) 40 detects that any one of the macro base stations 21 to 23 supports the MBMS rather than at the time when the radio terminal (UE) 40 finds out a desired service.

Figure 21:
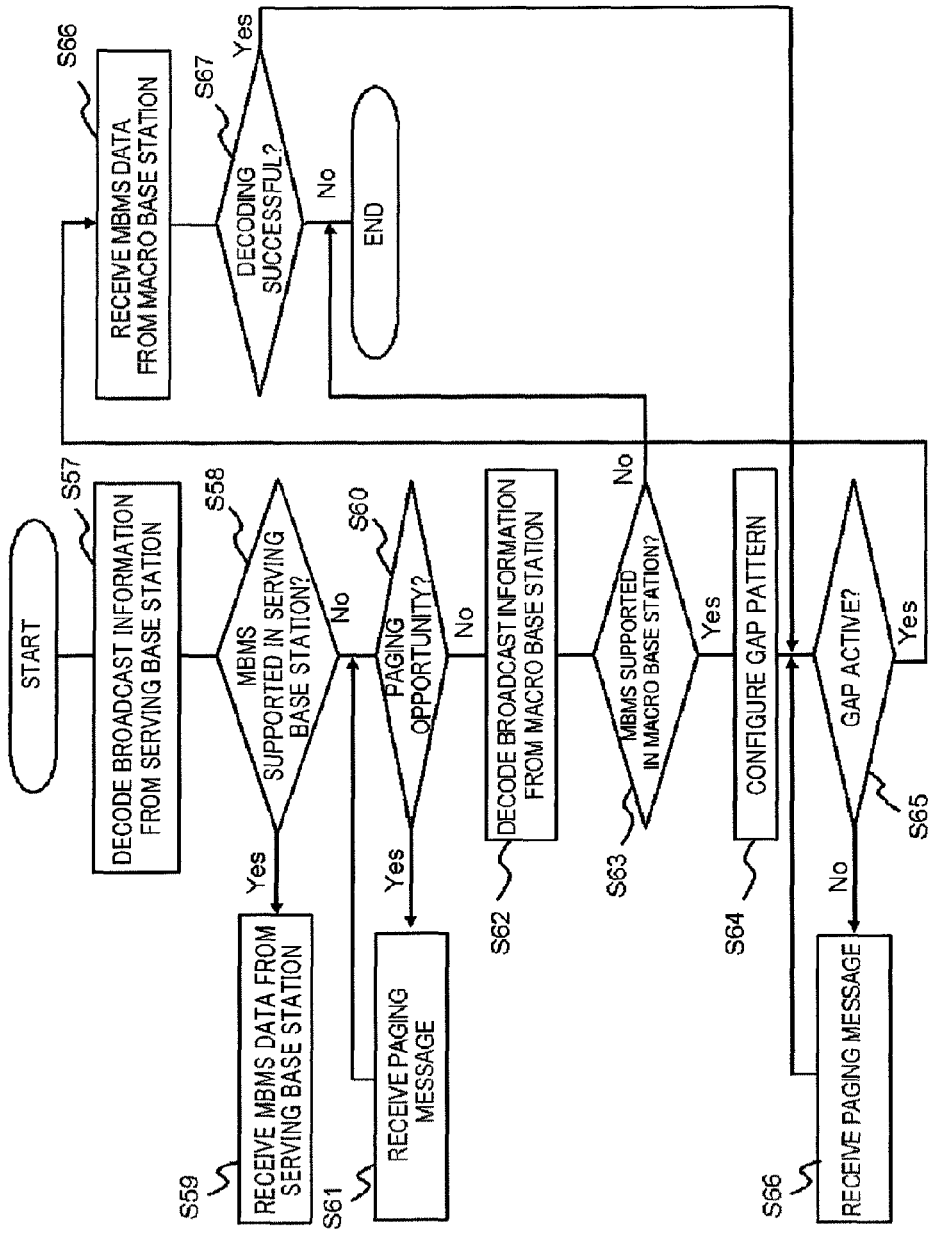
FIG. 21 is a flowchart schematically illustrating an operation procedure of a radio terminal when searching a service.

Next, referring to FIG. 21, the operation of the radio terminal 40 will be described. FIG. 21 is a flowchart schematically illustrating an operation procedure of the radio terminal 40. Note that the serving base station of the radio terminal 40 is not limited to the femto base station 31, but may be a micro base station or a pico base station. Also, the flowchart of FIG. 21 corresponds to a case where the serving base station of the radio terminal 40 supports the MBMS.

Referring to FIG. 21, at a certain time, the communication control unit 42 of the radio terminal 40 decodes the broadcast information that is received from the serving base station (step S57), and determines whether the MBMS is supported based on the result of the decoding (step S58). If the serving base station supports the MBMS ("YES" in step S58), the communication control unit 42 receives the MBMS data from the serving base station to receive the normal MBMS service (step S59).

If the serving base station does not support the MBMS ("NO" in step S58), the communication control unit 42 determines whether or not the current time corresponds to a paging opportunity (step S60). If the current time corresponds to the paging opportunity ("YES" in step S60), the communication control unit 42 continuously receives the paging message that is transmitted from the serving base station (step S61).

If the current time does not correspond to the paging opportunity ("NO" in step S60), the communication control unit 42 decodes the broadcast information that is received from the neighbouring base station as the non-serving base station (step S62), and determines whether or not the MBMS is supported based on the result of decoding (step S63). If the MBMS is not supported ("NO" in step S63), the communication control unit 42 determines that the radio terminal 40 is out-of-service, and finishes the above-described process. Also note that the determination of whether or not the MBMS is supported may be performed to all detectable non-serving base stations.

If any one of the neighbouring base stations supports the MBMS ("YES" in step S63), the communication control unit 42 calculates the paging timing for receiving the paging message (PCCH data) from the serving base station, and configures the gap pattern GP based on the result of the calculation (step S64).

Next, the communication control unit 42 determines whether the gap is active or inactive, that is, whether the current time is in an active period Tactive of the gap pattern GP or in an inactive period Tinactive of the gap pattern GP (step S65). If the gap is inactive ("NO" in step S65), the communication control unit 42 receives the paging message (step S66).

On the other hand, if the gap is active ("YES" in step S65), the communication control unit 42 receives the MBMS data from the neighbouring base station (step S66). As a result, the radio terminal 40 can receive the MBMS data packet from the neighbouring base station.

Then, if the decoding of the MBMS data is successful ("YES" in step S67), the communication control unit 42 determines that the MBMS data has been successfully received, and returns to the process of step S65. On the other hand, if the decoding of the MBMS data fails ("NO" in step S67), the communication control unit 42 determines that the radio terminal 40 is out-of-service, and finishes the above-described process. In this case by using a counter, if the decoding fails N times in total or N times in succession (N is a positive integer), it may be determined that the radio terminal 40 is out-of-service.

Although the embodiments of the invention have been described with reference to the drawings, those are exemplary, and diverse configurations except for the above-described configurations may be adopted. For example, although it is exemplified that in the respective communication sequences in the above-described embodiments, the radio terminal (UE) 40 mainly serves to the femto base station 31, the embodiments are not limited to that situation. Instead of the femto base station, another small base station, such as a micro base station 30 of FIG. 1 or a pico base station (Pico eNB), may be used. Accordingly, the serving base station of the radio terminal 40 after the cell reselection or the handover is not limited to the femto base station 31, and may be the micro base station or the pico base station. Even in the case where the radio terminal 40 changes the serving base station to another macro base station, it is possible to apply the above-described configuration.

In the above-described embodiments, it is assumed that the data delivery is performed in an MBSFN manner. In this case, only the received quality of the MBMS signal from the macro cell can be heightened even if the radio terminal stays in the femto cell. However, a normal MBMS, for example, "Single Cell Point-To-Multipoint (SC PTM)" of the LTE, may be adopted instead of the MBSFN.

Also, in the above-described embodiments, it is exemplified that whether to support the MBMS is discriminated in the unit of a base station (eNB). However, even in the same base station, it is possible to apply a case where it is discriminated in a sector unit whether to support the MBMS or a case where a cell that supports the MBMS and a cell that does not support the MBMS are discriminated with differentiating the frequencies to the above-described embodiments.

In the above-described embodiments, it is exemplified that the system is configured based on the "3GPP LTE". However, the system configuration is not limited to that configuration, and may be based, for example, on the standard called "3GPP Wideband Code Division Multiple Access (WCDMA)" or "Worldwide interoperability for Microwave Access (WiMAX).

The above-described gap pattern GP is a periodic pattern in which an inactive period during which the downlink signal is received from the base station to which the radio terminal 40 serves and an active period that excludes the inactive period are alternately set by time. Although the period in which the radio terminal 40 receives the downlink signal is called the inactive period, the periods are not limited to that configuration. The period in which the radio terminal 40 receives the downlink signal may be called the active period, and the period that excludes the active period may be called the inactive period.

This application claims priority based on Japanese Patent Application No. 2008-335193, filed Dec. 26, 2008, the entire contents of which are incorporated herein by reference.

The invention claimed is:

1. A wireless communication system comprising:
    a radio terminal;
    a serving radio base station that is a radio base station to which the radio terminal serves; and
    a non-serving radio base station that is a radio base station to which the radio terminal does not serve, wherein
    the radio terminal autonomously configures a gap pattern in accordance with a period in which at least one of a paging message, broadcast information, and a downlink dedicated signal is to be received from the serving radio base station, and
    the radio terminal receives multimedia content data which is broadcasted or multicasted from the non-serving radio base station in accordance with the gap pattern.

2. The wireless communication system according to claim 1, wherein
    the gap pattern includes a first period in which the radio terminal receives at least one of the paging message, the broadcast information, and the downlink dedicated signal from the serving radio base station, and
    the radio terminal receives the multimedia content data from the non-serving radio base station in a second period of the gap pattern, which excludes the first period.

3. The wireless communication system according to claim 2, wherein the gap pattern is a periodic pattern in which the first period and the second period are alternately set by time.

4. The wireless communication system according to claim 1, wherein when the radio terminal changes a radio base station to be served from the non-serving radio base station to the serving radio base station, the radio terminal configures the gap pattern.

5. The wireless communication system according to claim 4, wherein the radio terminal changes the serving radio base station by cell reselection or handover.

6. The wireless communication system according to claim 1, wherein the radio terminal receives broadcast information from the non-serving radio base station and recognizes that the non-serving radio base station is a base station that transmits the multimedia content data based on the broadcast information.

7. The wireless communication system according to claim 1, wherein the non-serving radio base station is a macro base station, and the serving radio base station is a small base station which manages a cell that is smaller than a cell managed by the macro base station.

8. The wireless communication system according to claim 7, wherein the serving radio base station is a femto base station.

9. The wireless communication system according to claim 1, wherein the multimedia content data is MBMS (multimedia broadcast and multicast service) data.

10. A wireless communication system comprising:
    a radio terminal;
    a serving radio base station that is a radio base station to which the radio terminal serves; and
    a non-serving radio baser station that base station to which the radio terminal does not serve, wherein
    the serving radio base station configures a gap pattern in response to a request for configuring the gap pattern, and
    the radio terminal receives multimedia content data which is broadcasted or multicasted from the non-serving radio base station in accordance with the gap pattern.

11. The wireless communication system according to claim 10, wherein
    the radio terminal transmits the request for configuring the gap pattern to the serving radio base station, and
    the serving radio base station notifies the radio terminal of configuration information of the gap pattern in response to the request.

12. The wireless communication system according to claim 11, wherein
    the radio terminal notifies the serving radio base station of scheduling information of the multimedia content data, which has been received before the radio terminal changes a radio base station to be served from the non-serving radio base station to the serving radio base station, after the radio terminal changes the radio base station to be served, and
    the serving radio base station configures the gap pattern according to the notified scheduling information.

13. The wireless communication system according to claim 10, wherein the radio terminal receives broadcast information from the non-serving radio base station and recognizes that the non-serving radio base station is abuse station that transmits the multimedia content data based on the broadcast information.

14. The wireless communication system according to claim 10, wherein the non-serving radio base station is a macro base station, and the serving radio base station is a small base station which manages a cell that is smaller than a cell managed by the macro base station.

15. The wireless communication system according to claim 14, wherein the serving radio base station is a femto base station.

16. The wireless communication system according to claim 10, wherein the multimedia content data is MBMS (multimedia broadcast and multicast service) data.

17. A radio terminal in a wireless communication system that includes the radio terminal, a serving radio base station that is a radio base station to which the radio terminal serves, and a non-serving radio base station that is a radio base station to which the radio terminal does not serve, wherein
    the radio terminal receives multimedia content data which is broadcasted or multicasted from the non-serving radio base station in accordance with a gap pattern, which is configured by the radio to terminal autonomously or by the serving radio base station in response to a request for configuring the gap pattern.

18. The radio terminal according to claim 17, wherein
The radio terminal transmits the request for configuring the gap pattern to the serving radio base station and receives the gap pattern from the serving radio base station, wherein
the gap pattern includes a first period in which the radio terminal receives at least one of a paging message, broadcast information, and a downlink dedicated signal from the serving radio base station, and
the radio terminal receives the multimedia content data from the non-serving radio base station in a second period of the gap pattern that excludes the first period.

19. The radio terminal according to claim 18, wherein
The radio terminal notifies the serving radio base station of scheduling information of the multimedia content data, which has been received before the radio terminal changes a radio base station to be served from the non-serving radio base station to the serving radio base station, after the radio to terminal changes the radio base station to be served, and
the radio terminal receives the gap pattern from the serving radio base station.

20. The radio terminal according to claim 17, wherein the multimedia content data is MBMS (multimedia broadcast and multicast service) data.

21. A radio base station to which a radio terminal serves in a wireless communication system that includes the radio terminal, the radio base station to which the radio terminal serves, and a non-serving radio base station that is a radio base station to which the radio terminal does not serve, the radio base station comprising
a communication control unit that generates a gap pattern in response to a request for configuring the gap pattern, when the radio terminal serves to the radio base station, and that allows the radio terminal to receive multimedia content data which is broadcasted or multicasted from the non-serving radio base station in accordance with the gap pattern.

22. The radio base station according to claim 21, wherein
the gap pattern includes a first period in which the radio terminal receives at least one of a paging message, broadcast information, and a downlink dedicated signal from a serving radio base station that is the radio base station to which the radio terminal serves, and
the radio terminal receives the multimedia content data from the non-serving radio base station in a second period of the gap pattern that excludes the first period.

23. A method of controlling communication of a radio terminal in a wireless communication system that includes the radio terminal, a serving radio base station that is a radio base station to which the radio terminal serves, and a non-serving radio base station that is a radio base station to which the radio terminal does not serve, including:
selecting the non-serving radio base station; and
receiving multimedia content data which is broadcasted or multicasted from the non-serving radio base station in accordance with a gap pattern, which is configured by the radio terminal autonomously or by the serving radio base station in response to a request for configuring the gap pattern.

24. The method of controlling communication according to claim 23, wherein
the gap pattern includes a first period in which at least one of a paging message, broadcast information, and a downlink dedicated signal from the serving radio base station is received, and
the radio terminal receives the multimedia content data from the non-serving radio base station in a second period of the gap pattern that excludes the first period.

25. A storage medium which stores a program that is read from a recording medium of a radio terminal and enables a processor to execute a communication control process, the radio terminal in a wireless communication system that includes the radio terminal, a serving radio base station that is a radio base station to which the radio terminal serves, and a non-serving radio base station that is a radio base station to which the radio terminal does not serve, the communication control process including:
a process of selecting the non-serving radio base station; and
a process of receiving multimedia content data which is broadcasted or multicasted from the non-serving radio base station in accordance with a gap pattern, which is configured by the radio terminal autonomously or by the serving radio base station in response to a request for configuring the gap pattern.

26. The storage medium according to claim 25, wherein
the gap pattern includes a first period in which at least one of a paging message, broadcast information, and a downlink dedicated signal from the serving radio base station is received, and
the radio terminal receives the multimedia content data from the non-serving radio base station in a second period of the gap pattern that excludes the first period.

* * * * *

UNITED STATES PATENT AND TRADEMARK OFFICE
CERTIFICATE OF CORRECTION

Page 1 of 1

PATENT NO. : 8,644,826 B2
APPLICATION NO. : 13/142199
DATED : February 4, 2014
INVENTOR(S) : Hisashi Futaki and Jinsock Lee It is certified that error appears in the above-identified patent and that said Letters Patent is hereby corrected as shown below:

In the Specification:

Column 17, Line 64: Delete "(step S40)." and insert -- 31 (step S40). --

In the Claims:

Column 24, Line 13: In Claim 10, after "that" insert -- is a radio --

Column 24, Line 43: In Claim 13, delete "abuse" and insert -- a base --

Column 24, Line 65: In Claim 17, after "radio" delete "to"

Signed and Sealed this
Twenty-fifth Day of November, 2014

Michelle K. Lee
*Deputy Director of the United States Patent and Trademark Office*